(12) United States Patent
Yamada et al.

(10) Patent No.: US 11,138,187 B2
(45) Date of Patent: Oct. 5, 2021

(54) DATA UPDATE PROGRAM, DATA UPDATE METHOD, AND DATA UPDATE DEVICE

(71) Applicant: FUJITSU LIMITED, Kawasaki (JP)

(72) Inventors: Kazuki Yamada, Kobe (JP); Takaaki Nakazawa, Kobe (JP); Takeya Mutoh, Akashi (JP)

(73) Assignee: FUJITSU LIMITED, Kawasaki (JP)

( * ) Notice: Subject to any disclaimer, the term of this patent is extended or adjusted under 35 U.S.C. 154(b) by 198 days.

(21) Appl. No.: 15/812,250

(22) Filed: Nov. 14, 2017

(65) Prior Publication Data

US 2018/0173749 A1    Jun. 21, 2018

(30) Foreign Application Priority Data

Dec. 20, 2016  (JP) .............................. JP2016-246125

(51) Int. Cl.
*G06F 16/27*     (2019.01)
*G06F 16/23*     (2019.01)

(52) U.S. Cl.
CPC .......... *G06F 16/2379* (2019.01); *G06F 16/27* (2019.01)

(58) Field of Classification Search
CPC ............................. G06F 16/2379; G06F 16/27
See application file for complete search history.

(56) References Cited

U.S. PATENT DOCUMENTS

| | | | | |
|---|---|---|---|---|
| 2006/0173917 A1* | 8/2006 | Kalmick | ............... | G06Q 10/109 |
| 2007/0033446 A1* | 2/2007 | Tinkler | .................. | H04L 41/069 |
| | | | | 714/47.2 |
| 2007/0124009 A1* | 5/2007 | Bradley | .................. | G06Q 10/06 |
| | | | | 700/99 |
| 2007/0179823 A1* | 8/2007 | Bhaskaran | ....... | G06Q 10/06393 |
| | | | | 705/7.39 |
| 2007/0202881 A1* | 8/2007 | Dervan | .................. | G06Q 30/02 |
| | | | | 455/450 |

(Continued)

FOREIGN PATENT DOCUMENTS

| | | |
|---|---|---|
| JP | 2001-273336 | 10/2001 |
| JP | 2008-059368 | 3/2008 |

(Continued)

OTHER PUBLICATIONS

Japanese Office Action dated Aug. 11, 2020 for corresponding Japanese Patent Application No. 2016-246125, with English Translation, 7 pages.

*Primary Examiner* — Cheyne D Ly
(74) *Attorney, Agent, or Firm* — Fujitsu Patent Center

(57) ABSTRACT

A non-transitory computer-readable storage medium storing therein a data update program for causing a computer to execute a process including in response to receiving a plurality of data transmitted from a data management device at a first interval, updating data in a searchable database stored in a data storage with the received plurality of data; in response to detecting specific data satisfying a specific condition among the plurality of data in the database, transmitting to the data management device a transmission request to transmit data identified by identification information of the specific data; and in response to receiving the data identified by the identification information of the specific data that is transmitted from the data management device in response to the transmission request, updating the specific data in the database with the received data.

10 Claims, 18 Drawing Sheets

(56) References Cited

U.S. PATENT DOCUMENTS

| | | | |
|---|---|---|---|
| 2008/0313024 A1 | 12/2008 | Kunichika et al. | |
| 2012/0185727 A1* | 7/2012 | Yoon | G06F 11/1438 |
| | | | 714/15 |
| 2014/0095541 A1* | 4/2014 | Herwadkar | G06F 16/24535 |
| | | | 707/774 |
| 2016/0239774 A1* | 8/2016 | Babar | G06Q 10/0637 |

FOREIGN PATENT DOCUMENTS

| | | |
|---|---|---|
| JP | 2011-158933 | 8/2011 |
| JP | 2014-175823 | 9/2014 |

* cited by examiner

FIG. 14

INCIDENT TABLE 26

| ID | INCIDENT DOCUMENTATION TIME | STATE OF PROGRESS (STATUS) | INITIAL RESPONSE DEADLINE | RESPONSE UPDATE TIME | RESOLUTION DEADLINE | PERIODIC COLLECTION TIME |
|---|---|---|---|---|---|---|
| 001 | 09/05 12:00 | RESPONDING | 09/05 24:00 | 09/07 12:00 | 09/10 12:00 | 09/09 08:00 |
| 002 | 09/05 13:30 | CLOSED (RESOLVED) | 09/06 01:30 | 09/08 17:00 | 09/10 13:30 | 09/09 08:00 |
| 003 | 09/05 16:00 | CLOSED (RESOLVED) | 09/06 04:00 | 09/08 13:00 | 09/10 16:00 | 09/09 08:00 |
| 004 | 09/08 10:00 | RESPONDING | 09/08 22:00 | 09/08 18:00 | 09/13 10:00 | 09/09 08:00 |
| 005 | 09/08 10:00 | RESPONDING | 09/08 22:00 | 09/08 18:00 | 09/09 17:30 | 09/09 08:00 |
| 006 | 09/08 23:00 | DOCUMENTED | 09/09 11:00 | - | 09/13 23:00 | 09/09 08:00 |
| 007 | 09/09 05:30 | DOCUMENTED | 09/09 17:30 | - | 09/14 05:30 | 09/09 08:00 |

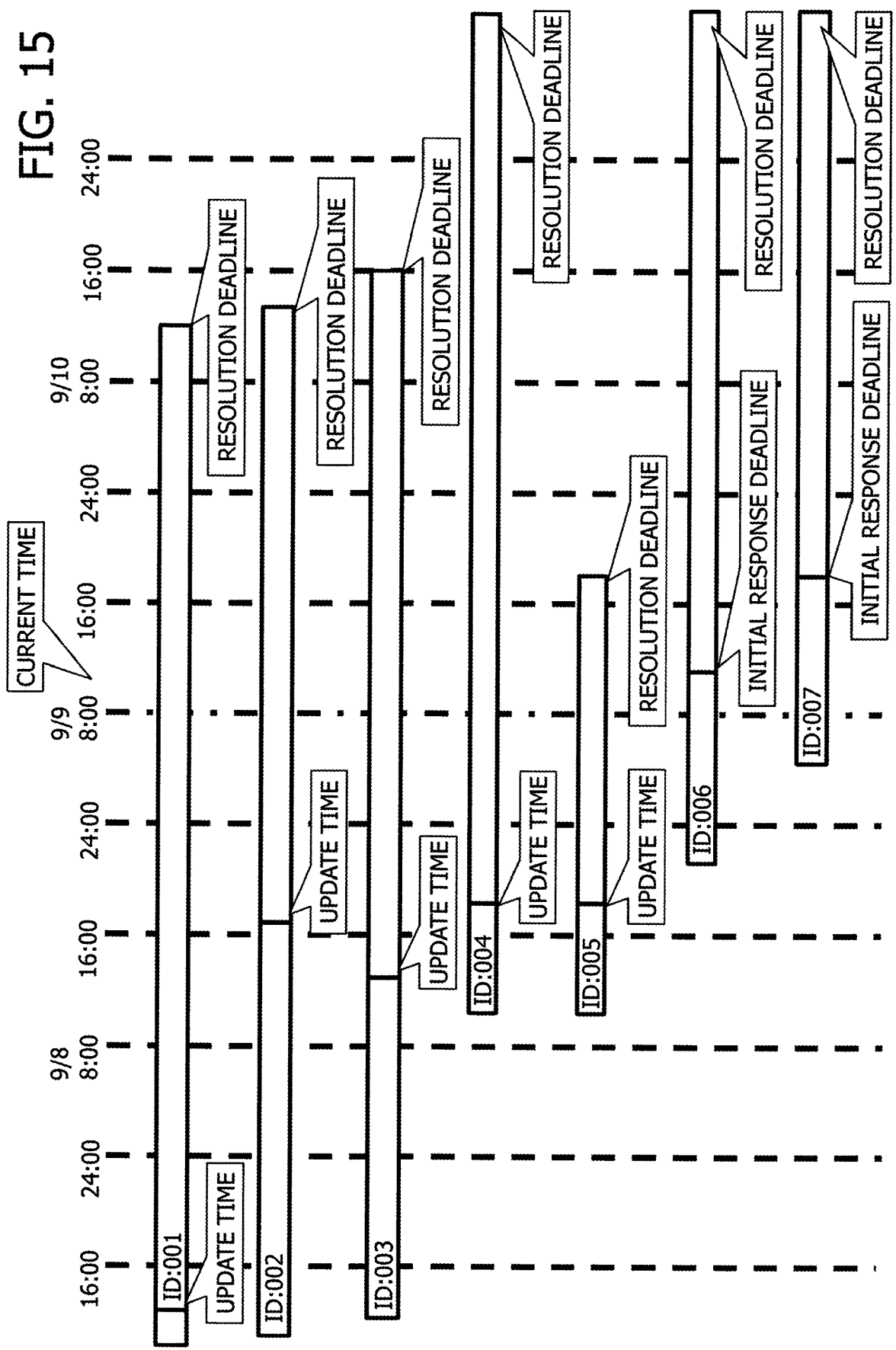

FIG. 16

SPECIFIC INCIDENT TABLE 27

| ID | INCIDENT DOCUMENTATION TIME | STATE OF PROGRESS (STATUS) | INITIAL RESPONSE DEADLINE | RESPONSE UPDATE TIME | RESOLUTION DEADLINE | PERIODIC COLLECTION TIME | PERTINENT CONDITION | REMAINING TIME T (MINUTES) | NO-UPDATE TIME $T_{Nu}$ (min.) | VIOLATION RISK LEVEL $E$, $E_{Nu}$ | SPECIFIC DB UPDATE INTERVAL R (min.) |
|---|---|---|---|---|---|---|---|---|---|---|---|
| 001 | 09/05 12:00 | RESPONDING | 09/05 24:00 | 09/07 12:00 | 09/10 12:00 | 09/09 08:00 | 2 | 3120M | 2640M | 5.5 | 87M |
| 005 | 09/08 10:00 | RESPONDING | 09/08 22:00 | 09/08 18:00 | 09/09 17:30 | 09/09 08:00 | 1 | 570M | - | 70% | 6.9M |
| 006 | 09/08 23:00 | DOCUMENTED | 09/09 11:00 | - | 09/13 23:00 | 09/09 08:00 | 1 | 180M | - | 75% | 6.4M |
| 007 | 09/09 05:30 | DOCUMENTED | 09/09 17:30 | - | 09/14 05:30 | 09/09 08:00 | 1 | 570M | - | 20.8% | 23M |

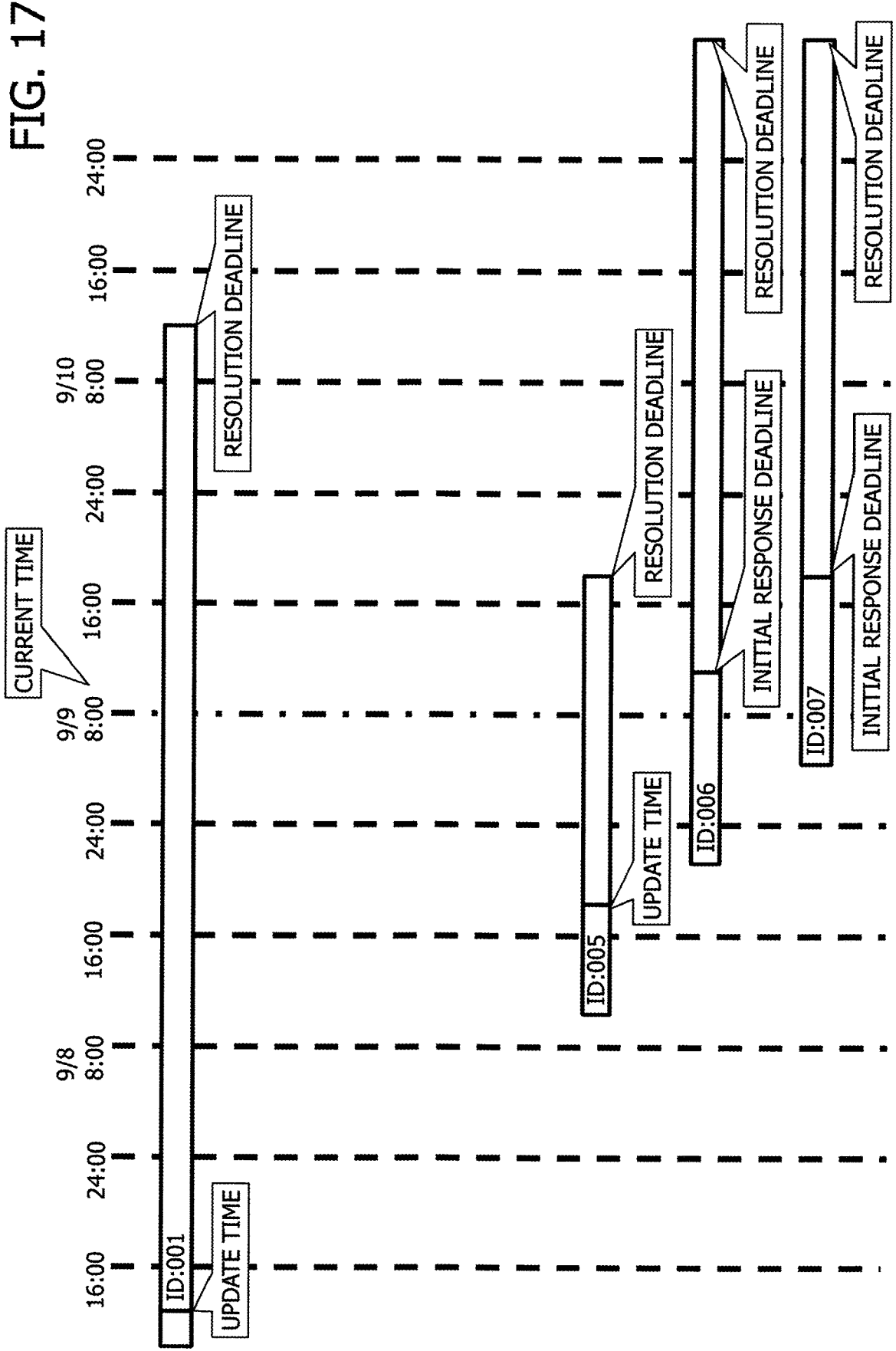

DATA UPDATE PROGRAM, DATA UPDATE METHOD, AND DATA UPDATE DEVICE

CROSS-REFERENCE TO RELATED APPLICATION

This application is based upon and claims the benefit of priority of the prior Japanese Patent Application No. 2016-246125, filed on Dec. 20, 2016, the entire contents of which are incorporated herein by reference.

FIELD

The present invention relates to a data update program, a data update method, and a data update device.

BACKGROUND

In a service system or the like that provides a predetermined service, various data are generated in response to execution of the service, and the content of this plurality of data is modified (updated). A data update/visualization device for collecting and visualizing the data, the amount of which increases constantly, collects the data from a data management device, registers or updates the data in a database, searches the database, and visualizes a state of progress of the data.

The data update/visualization device typically collects all of the data from the data management device periodically, and then registers or updates the data in the database. Newly generated data are registered in the database, and data already registered in the database are updated to the collected data. Further, in order to check an index specified as a key performance indicator (a KPI), the data update/visualization device retrieves and extracts the data registered or updated in the database periodically in accordance with a predetermined rule, and visualizes the extracted data on a manager terminal of the KPI. For example, when a KPI relating to an incident is an initial response deadline or a resolution deadline of the incident, an incident manager monitors an incident that has occurred via the data update/visualization device to determine whether or not an initial response has been implemented in relation to the incident, and whether or not the incident has been finally resolved.

Japanese Laid-open Patent Publication No. 2008-59368 and Japanese Laid-open Patent Publication No. 2014-175823 are patent documents relating to data monitoring.

SUMMARY

However, the amount of data generated and modified (updated) in the service system increases constantly, and therefore data collection/database update processing for collecting the large amount of data from the service system and updating the database therewith is implemented periodically at a predetermined update interval. Therefore, when the data are collected and updated infrequently, the latest data to be monitored on the basis of the KPI cannot be monitored in a timely fashion, and as a result, there is a risk of KPI violation.

A non-transitory computer-readable storage medium storing therein a data update program for causing a computer to execute a process including: in response to receiving a plurality of data transmitted from a data management device at a first interval, updating data in a searchable database stored in a data storage with the received plurality of data; in response to detecting specific data satisfying a specific condition among the plurality of data in the database, transmitting to the data management device a transmission request to transmit data identified by identification information of the specific data; and in response to receiving the data identified by the identification information of the specific data that is transmitted from the data management device in response to the transmission request, updating the specific data in the database with the received data.

According to one aspect, the latest data to be monitored can be collected while suppressing a load burdened on the data management device.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 14 is a view illustrating an example of the incident table 26.

FIG. 15 is a view depicting an example of a timetable of the seven incidents illustrated in FIG. 14.

FIG. 16 is a view illustrating a specific example of the specific incident table 27.

FIG. 17 is a view depicting an example of a timetable of the specific incidents illustrated in FIG. 16.

DESCRIPTION OF EMBODIMENTS

First Embodiment

Figure 1:
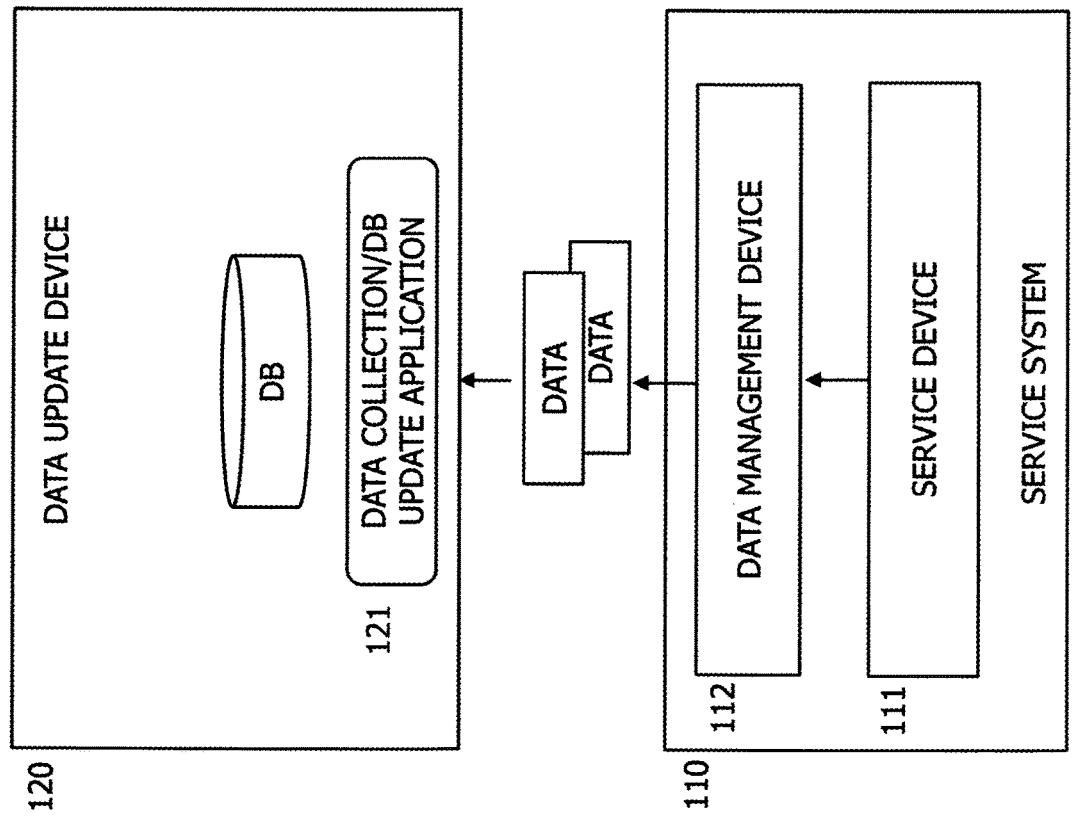
FIG. 1 is a schematic view illustrating a configuration of a data update device and a service system according to a first embodiment.

FIG. 1 is a schematic view illustrating a configuration of a data update device and a service system according to a first embodiment. A service system 110 includes a service device 111 that provides a predetermined service, and a data management device 112 that manages data generated while the service device provides the service and data obtained by modifying (updating) the generated data. The service device and the data management device are computers such as servers.

A data update device 120, meanwhile, collects the data managed by the data management device 112, and either stores the collected data in a database DB or updates the database DB with the collected data. The data update device 120 is a computer such as a server, and includes a memory and a processor. The processor executes a data collection/DB update application 121 to collect the data and update the database DB. During data collection by the data update device, the data update device 120 issues a request to the data management device 112 to transmit all of the data, and in response, the data management device transmits all of the data. The data update device 120 then either stores the collected data in the database DB, or updates the database DB with the collected data.

Figure 5:
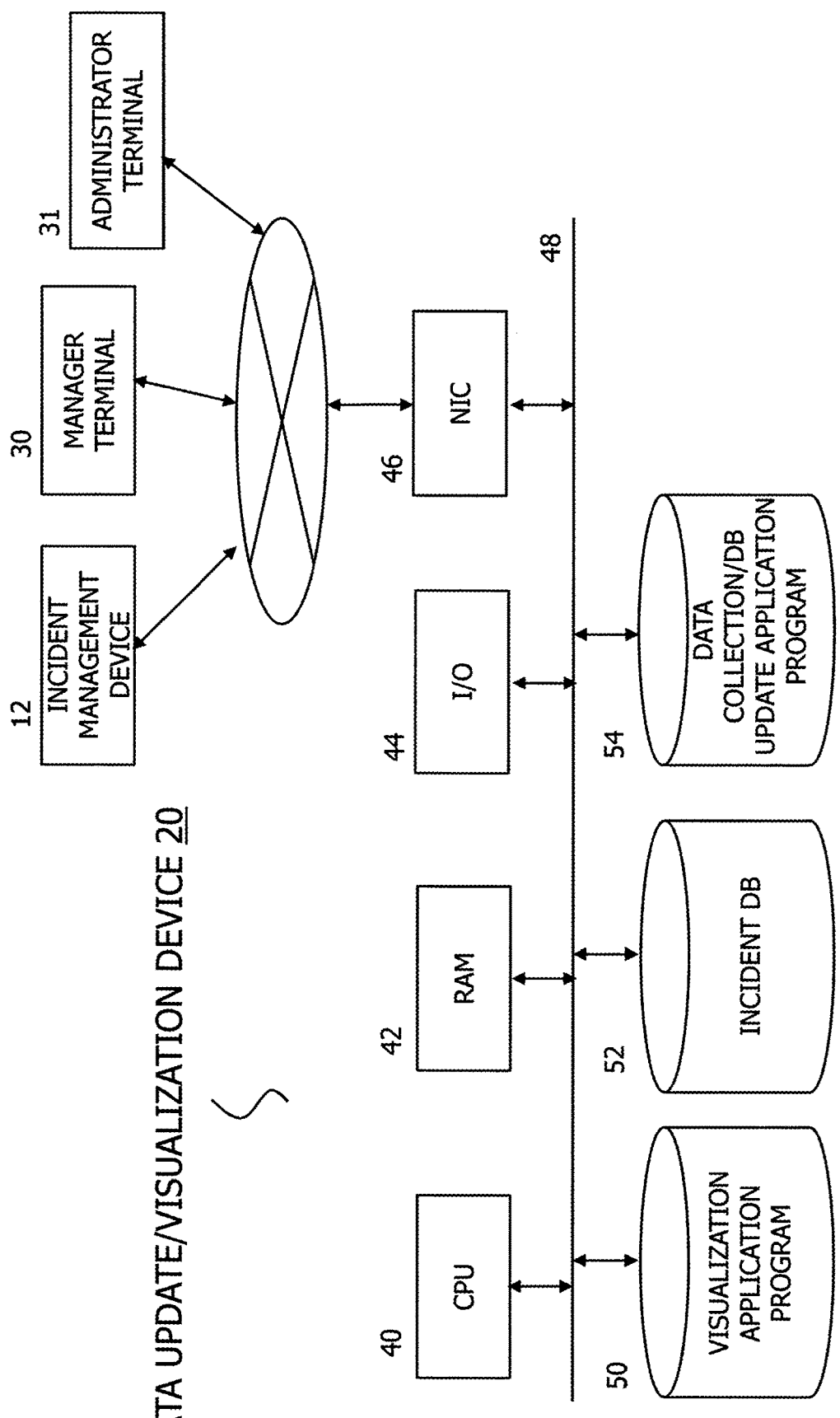
FIG. 5 is a view depicting an example configuration of the data update/visualization device 20.

Similarly to an example illustrated in FIG. 5, the data update device 120 is configured to include a processor, a memory, a network interface, a bus, storage for storing a program and a database, and so on.

The database DB provided in the data update device 120 is accessed by a data monitoring device, not depicted in the figures, in order to monitor a state of progress and so on of specific data. Hence, the data update device 120 preferably collects all of the data managed by the data management device 112 in real time, and reflects the collected data in the database DB.

When the amount of data increases, however, a large load is burdened on the data management device 112 while transmitting all of the data to the data update device in response to the transmission request from the data update device. Therefore, the data update device collects all of the data and updates the database DB periodically, for example every eight hours. As a result, the data monitoring device can monitor the state of progress of the data only at the frequency of the periodic data collection, and is not able to monitor the latest state of progress of the data on the basis of an index specified as a KPI, for example.

Figure 2:
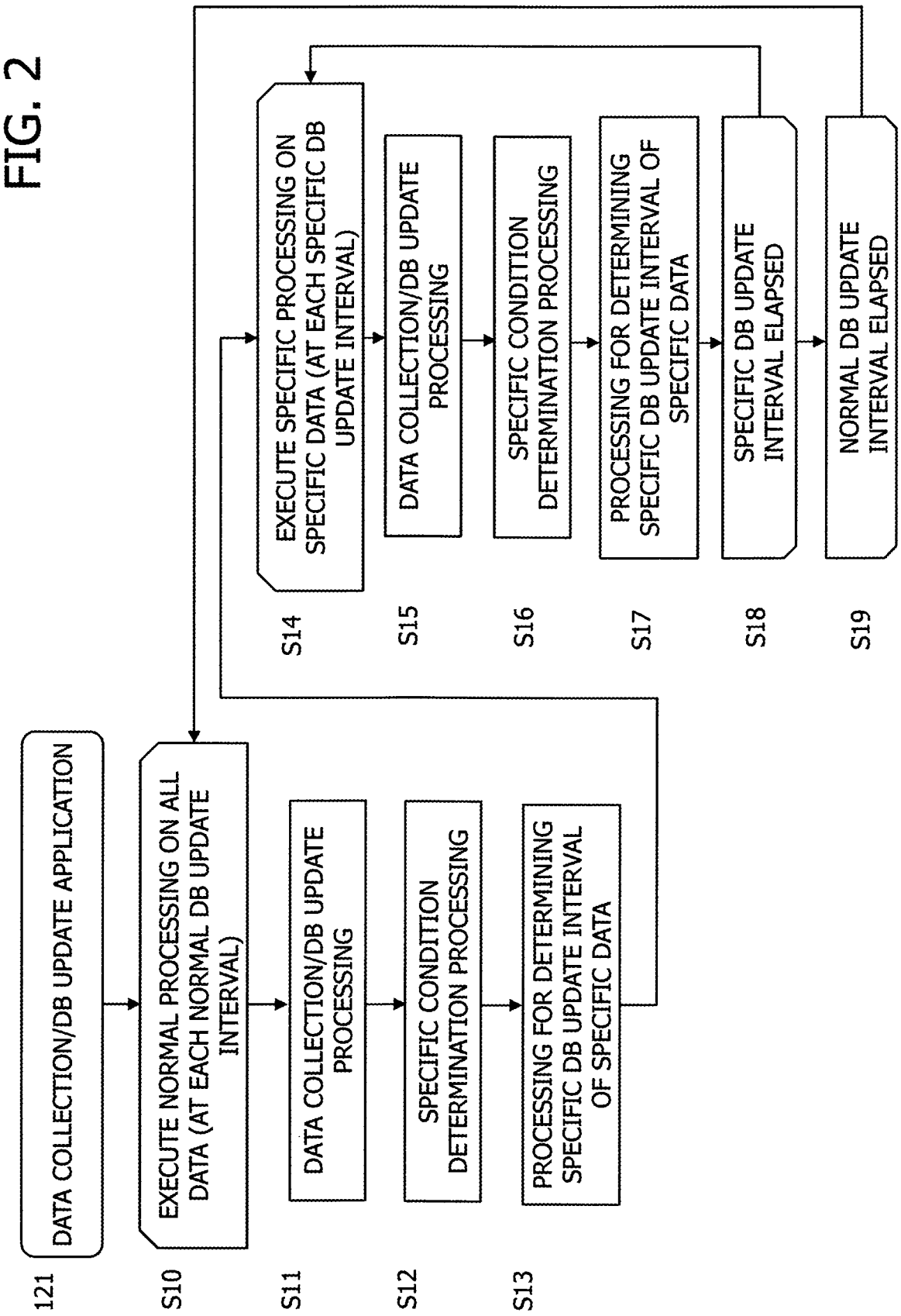
FIG. 2 is a flowchart depicting the processing executed by the data collection/DB update application 121 according to the first embodiment.

FIG. 2 is a flowchart depicting the processing executed by the data collection/DB update application 121 according to the first embodiment. The processor of the data update device executes the data collection/DB update application 121 to execute the following processing. For simplicity, it is assumed hereafter that the data update device executes the following processing.

The data update device executes normal processing on all of the data repeatedly at a normal DB update interval (S10, S19). The normal processing includes data collection and DB update processing (S11), specific condition determination processing (S12), and processing for determining a specific DB update interval for specific data (S13).

The data collection and DB update processing S11 is data collection processing in which the data update device 120 issues a request to the data management device 112 to transmit all of the data and receives all of the data, and stores or updates all of the received data in the database DB.

The specific condition determination processing S12 is processing for determining whether or not any of the data stored or updated in the database DB satisfy a specific condition, for example whether or not the data have a KPI violation risk due to being unable to comply with an index specified as a KPI or the like.

The processing for determining a specific DB update interval for specific data S13 is processing for determining a specific DB update interval, which is shorter than the normal DB update interval, for specific data determined to satisfy the specific condition in the specific condition determination processing S12. In this determination processing, the specific DB update interval is determined to be steadily shorter as the KPI violation risk of the specific data increases. By updating the specific data in the database at the specific DB update interval, the state of progress of the data can be ascertained more closely to real time.

The normal processing implemented on all of the data as described above is repeated at the normal DB update interval, which is set so that an excessive load is not burdened on the data management device 112 (S10, S19). Meanwhile, the data update device executes the following specific processing at the specific DB update interval on the data specified as the specific data (S14, S18). In other words, the specific processing is executed at the specific DB update interval, which is set to be shorter than the normal DB update interval at which the normal processing is executed, between normal DB update intervals.

The specific processing is executed on the specific data rather than all of the data. Further, the specific processing includes data collection and DB update processing (S15), specific condition determination processing (S16), and processing for determining the specific DB update interval of the specific data (S17), which are implemented on specific data that are corresponding to an update time based on the specific DB update interval. The respective processes are similar to those of the normal processing.

More specifically, the data update device collects the latest data corresponding to the specific data that are corresponding to the specific DB update interval from the data management device, and updates the corresponding specific data in the database DB (S15). The requested specific data and the collected data are associated with each other on the basis of data identification information. The collected data and the updated specific data are associated with each other in a similar fashion.

The specific condition determination processing is then executed on the updated specific data, and when the data no longer satisfy the specific condition, the data are deleted from the specific data (S16). Moreover, the specific DB update interval is determined again in relation to the updated specific data (S17).

The specific processing is executed only on the specific data that are corresponding to the specific DB update interval, and therefore the load burdened on the data management device does not greatly increase. Furthermore, the specific data are updated more closely to real time, and therefore the data monitoring device can monitor the state of progress of the specific data more precisely, thereby suppressing a KPI violation, for example.

The aforesaid data may be applied to incident data documented during an operation of a service system to be described below, thesis progress data monitored by a graduation thesis management system, and so on, for example.

Second Embodiment

Figure 3:
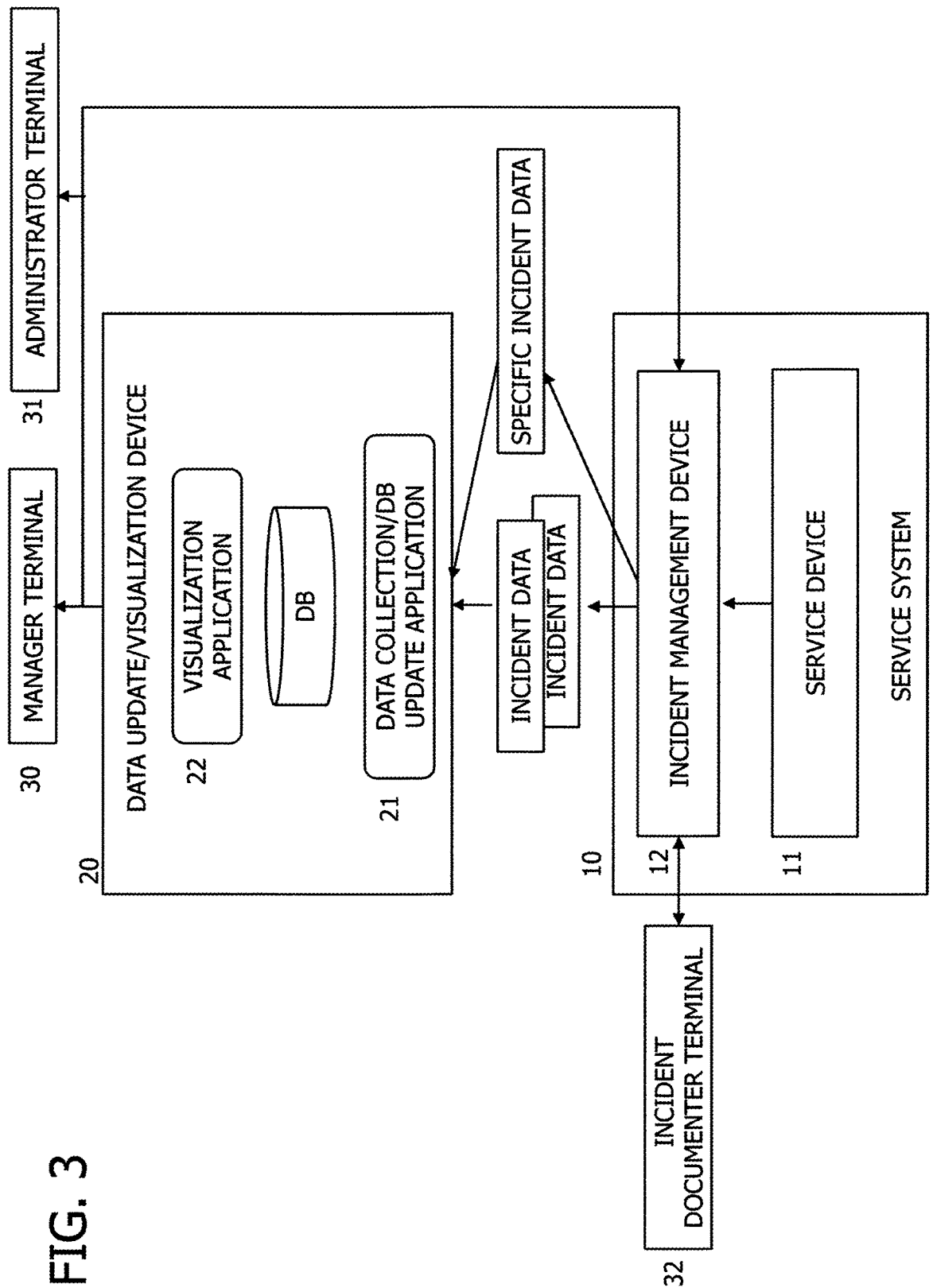
FIG. 3 is a schematic view depicting a configuration of a data update/visualization device and a service system according to a second embodiment.

FIG. 3 is a schematic view depicting a configuration of a data update/visualization device and a service system according to a second embodiment. A service system 10 includes a service device 11 that provides a predetermined service, and an incident management device 12 that manages incident data relating to an incident occurring while the service device provides the service, and incident data obtained by modifying (updating) the incident data. The service device and the incident management device are computers such as servers.

A data update/visualization device 20, meanwhile, collects the incident data managed by the incident management device 12, and either stores the collected incident data in a database DB or updates the database DB with the collected incident data. The data update/visualization device 20 is a computer such as a server, and a processor of the computer executes a data collection/DB update application 21 to collect the incident data and update the database DB. During data collection by the data update/visualization device, the data update/visualization device 20 issues a request to the incident management device 12 to transmit all of the incident data, and in response, the incident management device transmits all of the incident data. The collected data incident data are then stored in the database DB, or the database DB is updated with the collected incident data.

By executing a visualization application 22, an incident manager terminal 30, an incident administrator terminal 31, or the like can access the database DB provided in the data update/visualization device 20, and monitor the state of progress and so on of a specific incident. Hence, the data update/visualization device 20 preferably collects all of the data managed by the incident management device 12 in real time, and reflects the collected data in the database DB.

The incident management device 12 conducts incident documentation, intercommunication such as response processing to an incident, storage of an incident data update history, and so on between an incident documenter terminal 32, the incident manager terminal 30, and the incident administrator terminal 31. For this purpose, the incident management device 12 stores incident data relating to documentation and updating of an incident, an incident modification history, and so on in a database, not depicted in the figures. The incident management device typically tends to be customized on the basis of the service content and service policy of the service device 11.

Figure 4:
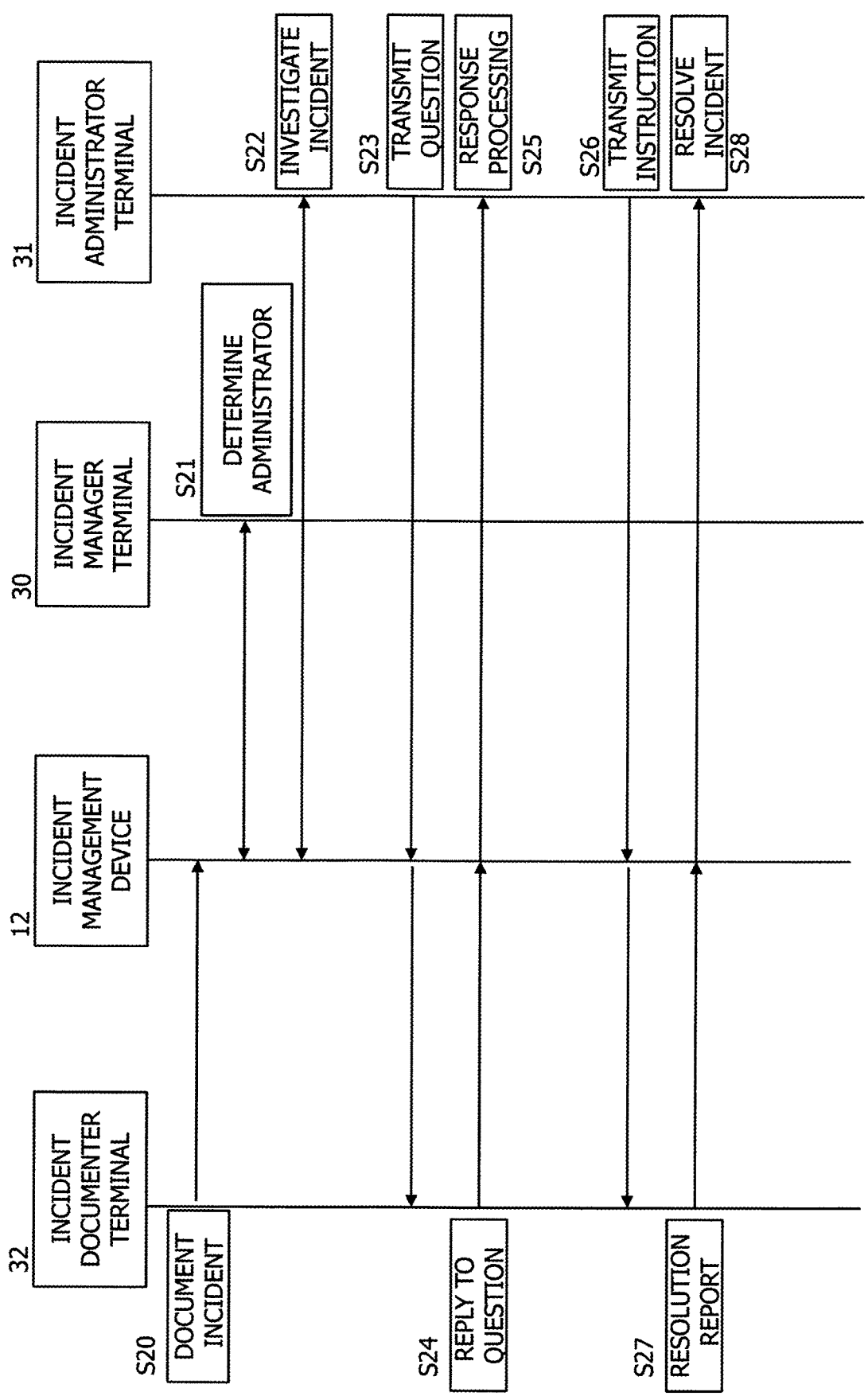
FIG. 4 is a view depicting an example of the intercommunication conducted by the incident management device from documentation of an incident to incident response and incident resolution.

FIG. 4 is a view depicting an example of the intercommunication conducted by the incident management device from documentation of an incident to incident response and incident resolution. As the service device 11 provides an unspecified large number of users with a predetermined service, various incidents, such as login failures and order placement failures, for example, occur. In this case, a user documents the generated incident.

In the example depicted in FIG. 4, a user encountering an incident documents the incident in the incident management device 12 at the incident documenter terminal 32 as an incident documenter (S20). The incident management device 12 registers the newly documented incident in the database of the incident management device, not depicted in the figures.

When the incident manager accesses the incident management device 12 at the incident manager terminal 30 in response and discovers the documented incident, the incident manager specifies an incident administrator, who will be in charge of the response to the incident, on the basis of the content of the incident (S21). The incident administrator is registered in the database (not depicted in the figures) of the incident management device.

Next, when the incident administrator accesses the incident management device from the administrator terminal 31 and discovers the incident requiring a response, the incident administrator at the administrator terminal 31 investigates the incident (S22). When, during the investigation stage, a query or the like arises, the incident administrator terminal 31 transmits a question relating to the query to the incident documenter via the incident management device 12 (S23). In response, the incident documenter terminal at 32 transmits a reply to the question to the incident administrator at 31 via the incident management device 12 (S24).

Next, the incident administrator analyses the reply to the question, considers countermeasures for resolving the incident (S25), and transmits an instruction by email prescribing response processing to the incident documenter terminal via the incident management device 12 (S26). When, in response, the incident documenter executes the response processing such that the incident is resolved, the incident documenter at 31 transmits a resolution report to the incident administrator via the incident management device (S27). The incident administrator at 31 determines on the basis of the resolution report that the incident has been resolved, and registers "resolved" in the incident management device in relation to the corresponding incident data from the incident administrator terminal (S28).

In the above description, reporting of an incident by the user who encounters the incident (S20) corresponds to documentation of the incident, while determining the administrator who will respond to the documented incident (S21), transmitting a question (S23), transmitting an instruction prescribing countermeasures (S26), and so on are all responses to the incident. A KPI index often specifies that the initial response to documentation of an incident and the response that ultimately leads to resolution should be completed within respective deadlines, and rules relating to an initial response deadline, a resolution deadline, and so on are set in advance on the basis of the importance of the incident. Therefore, when the initial response deadline and the resolution deadline of a documented incident are not met, a KPI violation occurs.

As noted above, the incident management device 12 may be customized for the service device 11, and forms a part of the service system 10. The data update/visualization device 20, meanwhile, periodically collects the documents of the incident and intercommunication data generated as the incidents managed by the incident management device 12 are responded to, and visualizes the collected data for the incident manager and so on. For this purpose, the data update/visualization device 20 has to collect and visualize the incident data in accordance with output specifications relating to the incident data provided by the incident management device 12. However, there are certain restrictions for adding modifications to the configuration of the incident management device 12 in order to collect and visualize the incident data.

FIG. 5 is a view depicting an example configuration of the data update/visualization device 20. The data update/visualization device 20 includes a CPU 40 serving as a processor, a main memory 42, an input/output device 44, a network interface 46, and a bus 48 connecting these components to each other. Further, a visualization application program 50, an incident data database 52, and a data collection/update application program 54 are stored in storage serving as an auxiliary storage device. When the data update/visualization device is activated, the processor 40 expands the application programs 50, 54 in the main memory 42, and executes the programs.

The processor of the data update/visualization device 20 executes the data collection/DB update application program to transmit an incident data transmission request to the incident management device 12, receive incident data transmitted thereto by the incident management device 12 in response, and either store the received incident data in the database DB or update the database DB therewith.

The data update/visualization device 20 then visualizes the incident data in the updated database in a suitable form for incident management.

Figure 6:
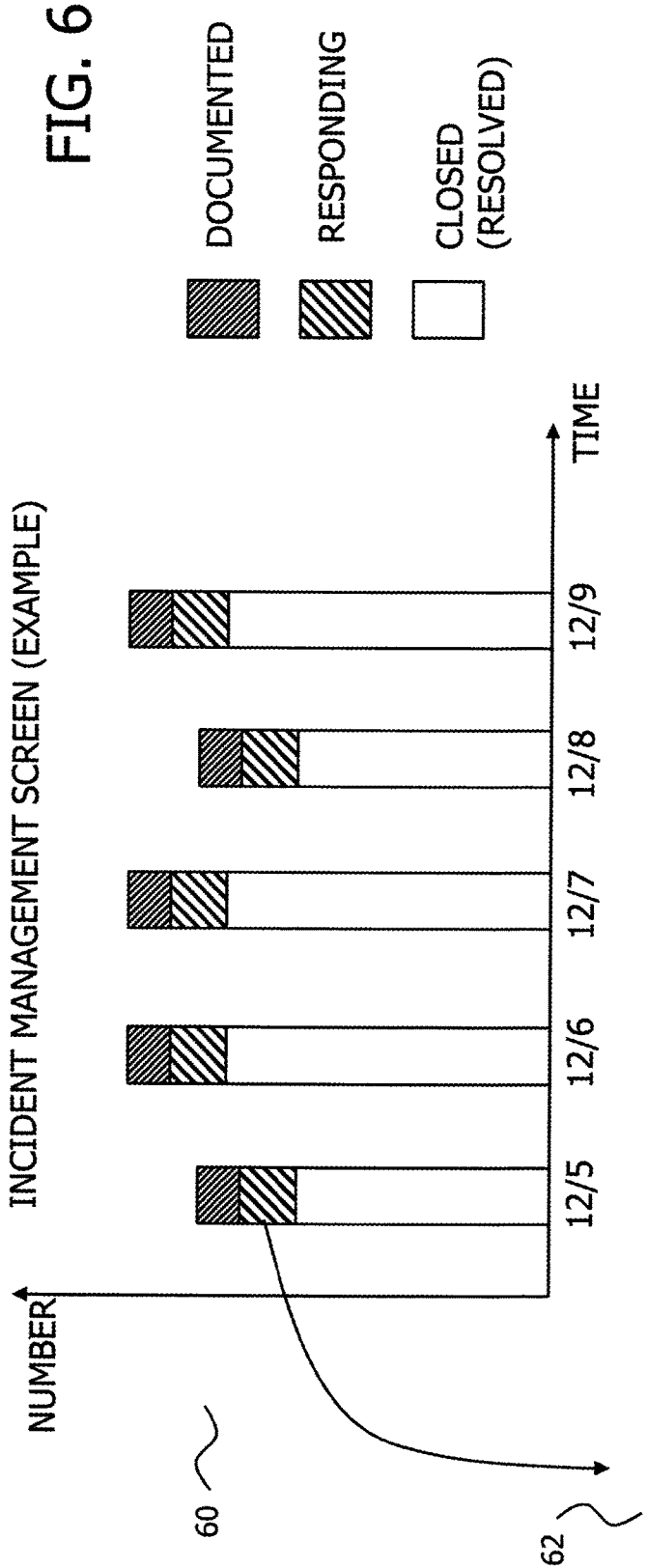
FIG. 6 is a view depicting an example of an incident management screen.

FIG. 6 is a view depicting an example of an incident management screen. FIG. 6 depicts an incident aggregate graph 60 and an incident list 62. The incident aggregate graph 60 is a bar graph having time (in day units) on the horizontal axis and the number of incidents on the vertical axis, and aggregates the number of incidents occurring on each day from December 5 to December 9 according to status. The state of progress or status of the incident is one of three types, namely (1) "Documented", indicating that the incident has been documented but an initial response has not been implemented thereon, (2) "Responding", indicating that an initial response has been implemented but the incident is not yet resolved, and (3) "Closed", indicating that the incident has been resolved and documentation thereof has been closed. Under normal circumstances, most incidents are closed, while some of the incidents are in the "documented" or "responding" state.

The incident list 62 displays incidents that have the "responding" status on December 5, for example. The displayed content includes an incident ID, a documentation time, the documenter, a title outlining the content of the incident, and the content of the response to the incident (only the latest response, however). In FIG. 6, two incidents are listed. An incident having an ID 011 is a login fault in relation to which the administrator has transmitted a question to the documenter, and an incident having an ID 015 is a server fault in relation to which an administrator has been determined. Both incidents have the "responding" status, indicating that initial responses have been completed and resolution is to be achieved before the resolution deadline.

Current circumstances regarding incident management, as described above, are as follows. In order to meet the response deadlines of the constantly increasing number of incidents, the incident management device 12 and the data update/visualization device 20 cooperate to visualize the response statuses of the incidents. The incident response deadlines, such as the initial response deadline (the time limit from incident documentation to initial response) and the resolution deadline (the time limit from incident documentation to resolution), are strictly defined by the KPI, and differ for each service provider.

As regards the incident resolution deadline, the time limit differs according to the importance and the urgency of the incident, and may be as long as one week or as short as one hour. Hence, the statuses of the incidents have to be checked in real time. Moreover, an incident having a low degree of priority and a long deadline may be overtaken by responses to other incidents having a higher degree of priority, and may as a result be abandoned for a long time and ultimately not responded to.

In consideration of the increasing load on the incident management device, however, the data update/visualization device 20 collects all of the incident data from the incident management device periodically, for example every eight hours, and updates the database DB therewith. As a result, processing is not implemented sufficiently closely to real time on the visualization subject database. When, in order to secure real-time processing, the frequency with which all of the data are aggregated is shortened, the incident management device 12 outputs a large amount of incident data at short intervals, leading to an increase in the load on the incident management device and an adverse effect on the incident management operation.

Hence, in the second embodiment, a violation risk determination unit for determining the risk of a KPI violation and a specific DB update interval determination unit for determining a specific DB update interval for a specific incident specified as a violation risk are added to a data aggregation/DB update application in addition to a data aggregation/update unit.

Figure 7:
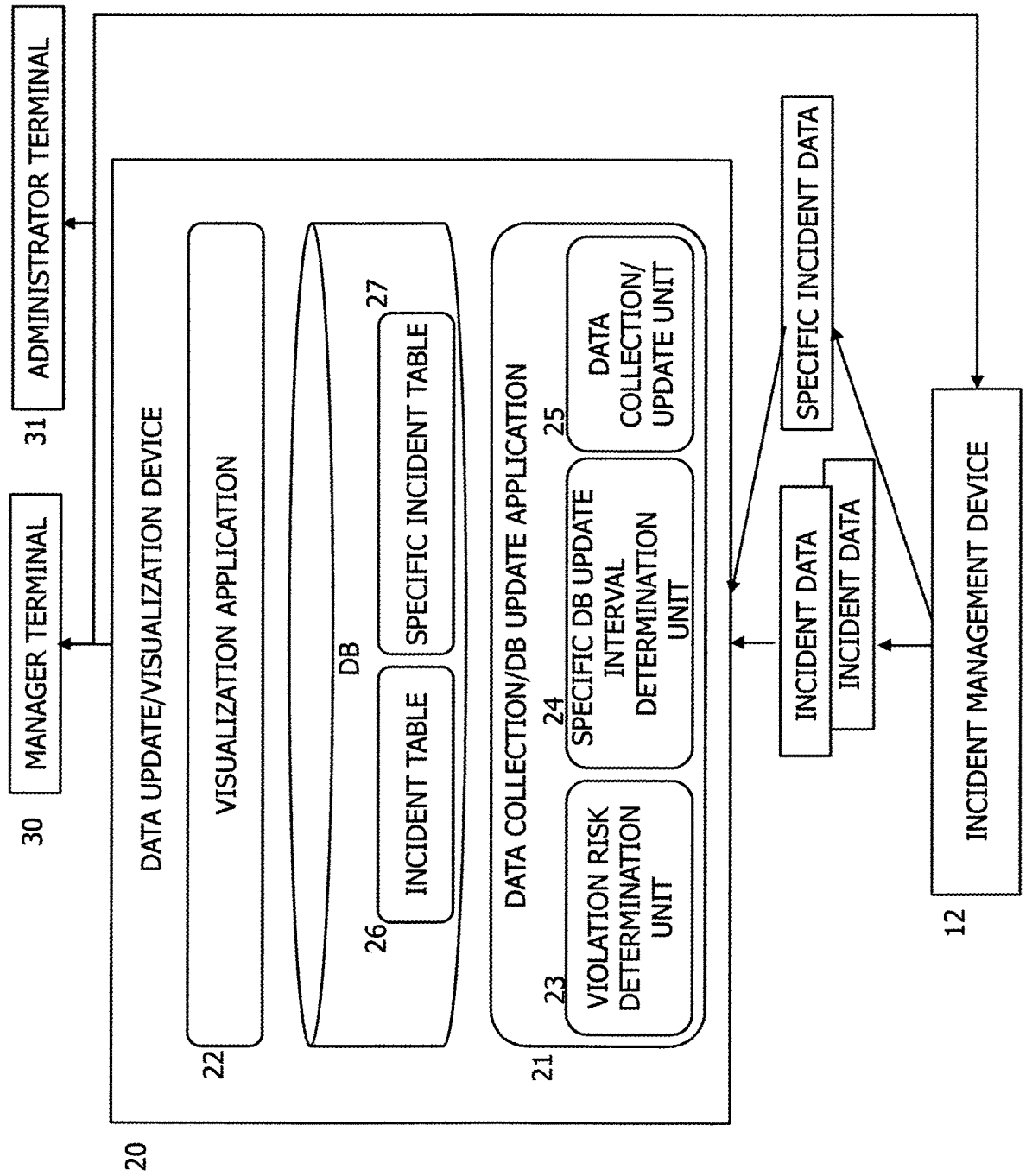
FIG. 7 is a view depicting a specific configuration of the data update/visualization device according to the second embodiment.

FIG. 7 is a view depicting a specific configuration of the data update/visualization device according to the second embodiment. FIG. 7 illustrates the respective configurations of the data collection/DB update application 21 and the database DB specifically in the configuration of FIG. 3. As described above, the data collection/DB update application 21 includes a violation risk determination unit 23, a specific DB update interval determination unit 24 for a specific incident specified as a violation risk, and a data aggregation/update unit 25.

The database DB, meanwhile, includes an incident table 26 on which data relating to all incidents are stored, and a specific incident table 27 on which data relating to specific incidents specified as violation risks are stored. The data relating to the specific incidents are extracted from the incident table 26 and stored on the specific incident table 27. Either the specific incidents are deleted from the incident table 26, or the data relating to all of the incidents are stored as is without being deleted. In the latter case, the data relating to the specific incidents are stored in duplicate on the incident table 26 and the specific incident table 27.

Figure 8:
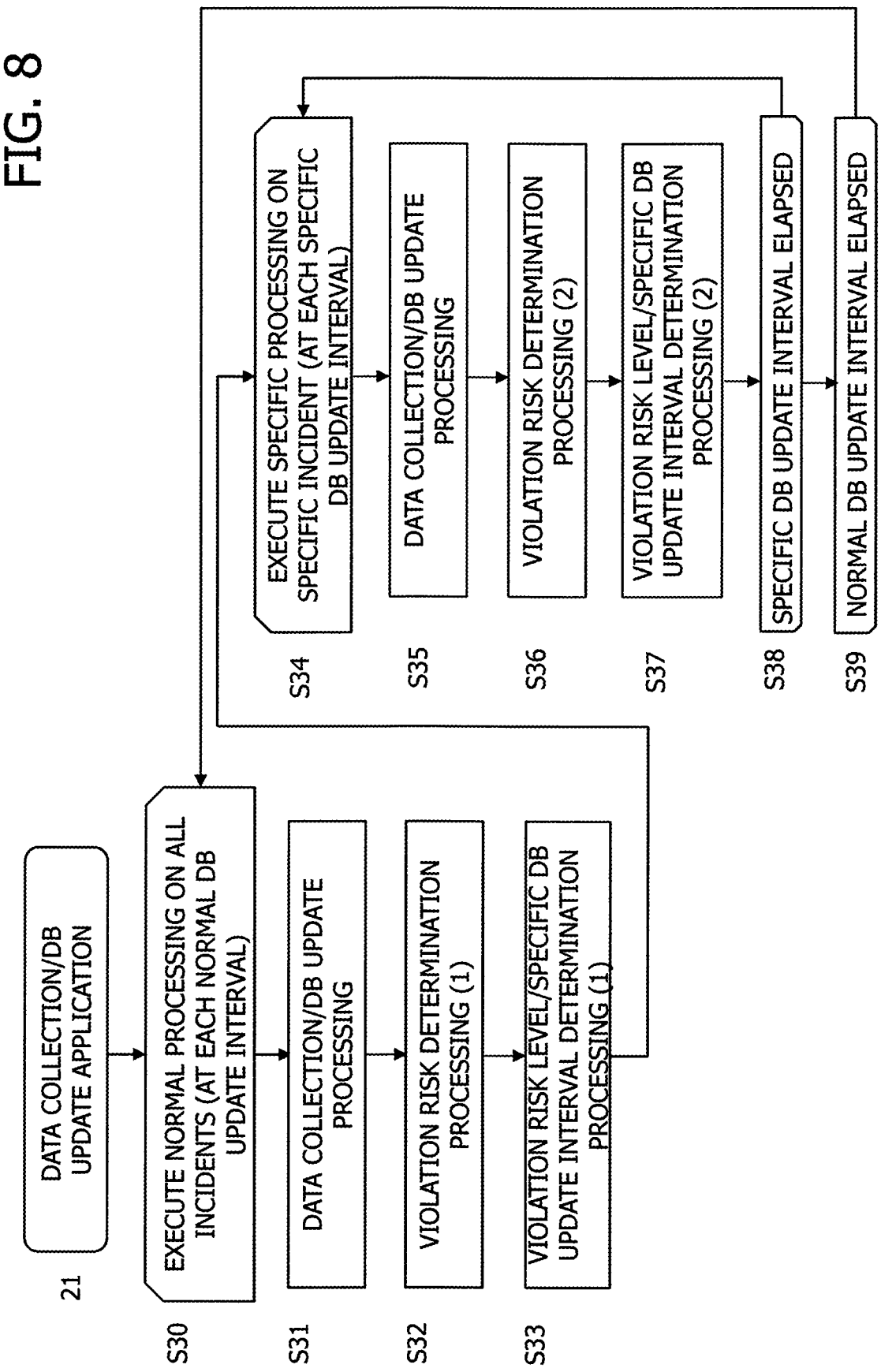
FIG. 8 is a flowchart depicting processing executed by the data collection/DB update application 21.

FIG. 8 is a flowchart depicting processing executed by the data collection/DB update application 21. The processor of the data update/visualization device 20 executes the data collection/DB update application 21 to implement the following processing.

The data update/visualization device 20 executes normal processing on all of the data repeatedly at a normal DB update interval (S30, S39). The normal processing includes data collection and DB update processing (S31), violation risk determination processing (1) (S32), and violation risk level and specific DB update interval determination processing (1) (S33).

The data collection and DB update processing S31 includes data collection processing, in which the data update/visualization device 20 issues a request to the incident management device 12 to transmit all of the data and receives all of the data, and processing, in which the data update/visualization device 20 stores or updates all of the received data in the database DB. The data are collected and updated on the basis of incident data identification information.

The violation risk determination processing (1) S32 is processing for determining whether or not any of the data stored or updated in the database DB have a KPI violation risk due to being unable to comply with an index specified as a KPI or the like, for example.

The violation risk level and specific DB update interval determination processing (1) S33 is processing for determining the violation risk level of the specific incident data specified as a violation risk in the violation risk determination processing S32, and determining a specific DB update interval that is shorter than the normal DB update interval. In this determination processing, for example, the violation risk level is determined to be steadily higher as the time remaining to the initial response deadline or the resolution deadline of the incident decreases or is shorter, and the specific DB update interval is determined to be steadily shorter as the violation risk level increases. As regards the specific incident data, the specific incident data in the database are updated not only at the normal DB update interval, but also at the shorter specific DB update interval, and therefore the incident manager can ascertain the status of specific incident data having a violation risk more closely to real time.

The data update/visualization device repeats the normal processing described above on all of the data at the normal DB update interval, which is set so that an excessive load is not burdened on the data management device 12 (S30, S39). Meanwhile, the data update/visualization device 20 executes the following specific processing at the specific DB update interval on the incident data specified as a specific incident having a violation risk (S34, S38). In other words, the specific processing is executed at the specific DB update interval, which is set to be shorter than the normal DB update interval at which the normal processing is executed, between normal DB update intervals.

Among the specific incident data, the specific processing is executed only on specific incident data that are corresponding to an update time based on the specific DB update interval, rather than on all of the incident data, and the specific processing includes data collection and DB update processing (S35), violation risk determination processing (2) (S36), and violation risk level and specific DB update interval determination processing (S37). The respective processes are similar to those of the normal processing. More specifically, the data update/visualization device 20 collects the latest incident data corresponding to the specific incident data that are corresponding to the specific DB update interval from the data management device, and updates the corresponding specific incident data in the database DB (S35). The requested specific incident data and the collected incident data are associated with each other on the basis of incident data identification information (an ID). The collected incident data and the specific incident data to be updated are associated with each other in a similar fashion. The violation risk determination processing (2) (S36) is then executed on the updated specific incident data, and when there is no longer a violation risk, the updated specific incident data are deleted from the specific incident data. Moreover, the specific DB update interval is determined again in relation to the updated specific incident data (S37).

As illustrated in FIG. 8, the data update/visualization device 20 according to this embodiment executes the data collection/DB update application to execute a periodical collection or a normal collection of all of the incident data in the incident management device 12 at the normal DB update interval, for example every eight hours, and update the incident table 26 in the database DB. This corresponds to normal DB update processing. The normal DB update interval does not necessarily have to be a fixed time interval, and may be set at fixed times within business hours, such as 8:00, 12:00, and 18:00 every day.

Further, the data update/visualization device 20 determines the KPI violation risk of all of the incident data collected during periodic collection, and stores incident data determined to have a violation risk on the specific incident table 27 as specific incident data. Furthermore, the data update/visualization device 20 determines the KPI violation risk level of each specific incident, and determines the specific DB update interval to be steadily shorter as the violation risk level of the incident increases.

The data update/visualization device 20 then collects the specific incident data that have reached the update time corresponding to the specific DB update interval, and updates the DB therewith. This corresponds to specific collection or specific DB update processing. The data update/visualization device 20 then determines whether or not the collected specific incident data have a violation risk, and determines the violation risk level and a new specific DB update interval.

The respective processes of FIG. 8 will now be described in further detail.

Figure 9:
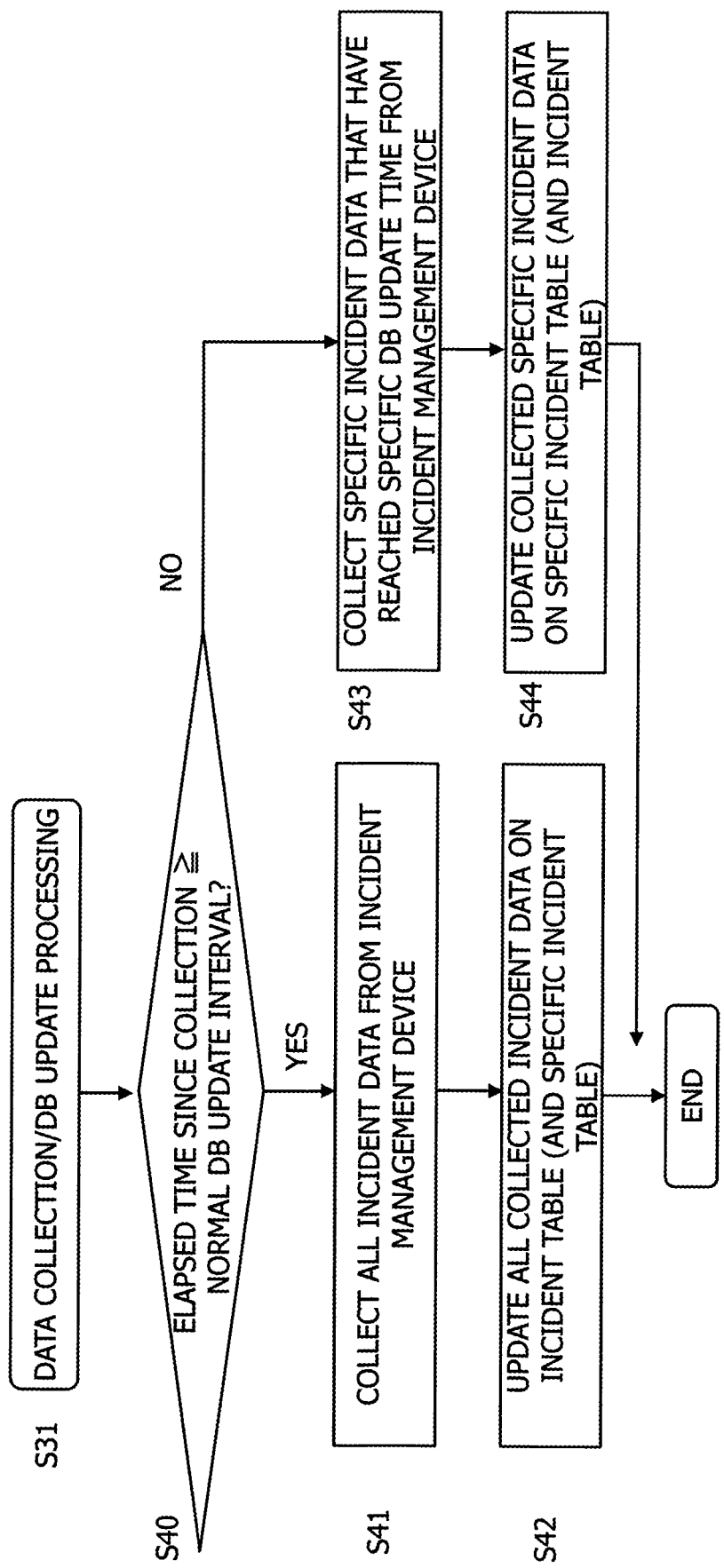
FIG. 9 is a flowchart depicting processing implemented during the data collection/DB update processing S31, S35.

FIG. 9 is a flowchart depicting processing implemented during the data collection/DB update processing S31, S35. When an elapsed time following the previous normal collection reaches the normal DB update interval (YES in S40), the data update/visualization device 20 collects all of the incident data from the incident management device 12 (S41), and stores or updates all of the collected incident data on the incident table 26 (S42). At this time, the data on the specific incident table 27 that correspond to specific incident data, among the collected incident data, are also updated. Examples of the incident table 26 and the specific incident table 27 will be described below.

When, on the other hand, the elapsed time has not reached the normal DB update interval (NO in S40), according to FIG. 8, an elapsed time following the previous specific DB update has reached the specific DB update interval. Hence, the data update/visualization device 20 collects the specific incident data that have reached the specific update time from the incident management device 12 (S43), and updates the specific incident table 27 with the collected specific incident data (S43). At this time, the incident table 26 is also updated with the collected specific incident data.

Next, a specific example of the incident table will be described before describing the violation risk determination processing (1) S32 and the specific DB update interval determination processing (1) S33.

FIG. 14 is a view illustrating an example of the incident table 26. The incident table 26 in FIG. 14 stores seven sets of incident data having IDs 001 to 007. Each set of incident data includes the incident documentation time, the state of progress or status of the incident ("documented", "responding", or "closed" (resolved)), the initial response deadline, a response update time, i.e. the time of an immediately preceding response, the resolution deadline, a most recent periodic collection time, and so on. In other words, the incident data collected by the data update/visualization device include data needed by the incident manager to manage the KPI violation risk, but not the history of the responses to the incident, the content of the intercommunication relating to the response, and so on, which are stored in the database of the incident management device 12. Here, the response update time is a time at which a new response is executed in relation to an incident such that the response is updated.

FIG. 15 is a view depicting an example of a timetable of the seven incidents illustrated in FIG. 14. In FIG. 15, the normal processing times at which periodic collection is performed are depicted in a left-right direction as 8:00, 16:00, and 24:00 every day, and periods extending from the documentation time to the resolution deadline of the seven incidents are depicted on the timetable as strips. The ID number, the initial response deadline, the response update time ("response time" in the figure), and the resolution deadline are indicated in relation to each incident. The initial response deadline is indicated only for incidents not yet responded to, and the response update time (the update time) is indicated only for incidents in relation to which a response has been executed. The current time is set at the periodic collection time of 8:00 on September 9 (9/9).

The immediately preceding response update time and the resolution deadline are indicated in relation to the incident ID:001, and the status thereof is "responding" (an initial response has been implemented but the incident is not yet resolved).

The immediately preceding response update time and the resolution deadline are indicated in relation to the incidents ID:002 and ID:003, and the respective statuses thereof are "closed" (resolved). Hence, these incidents were resolved by the immediately preceding response.

The immediately preceding response update time and the resolution deadline are indicated in relation to the incidents ID:004 and ID:005, and the respective statuses thereof are "responding".

The initial response deadline and the resolution deadline are indicated in relation to the incidents ID:006 and ID:007, and the respective statuses thereof are "documented" (an initial response has not yet been implemented).

Figure 10:
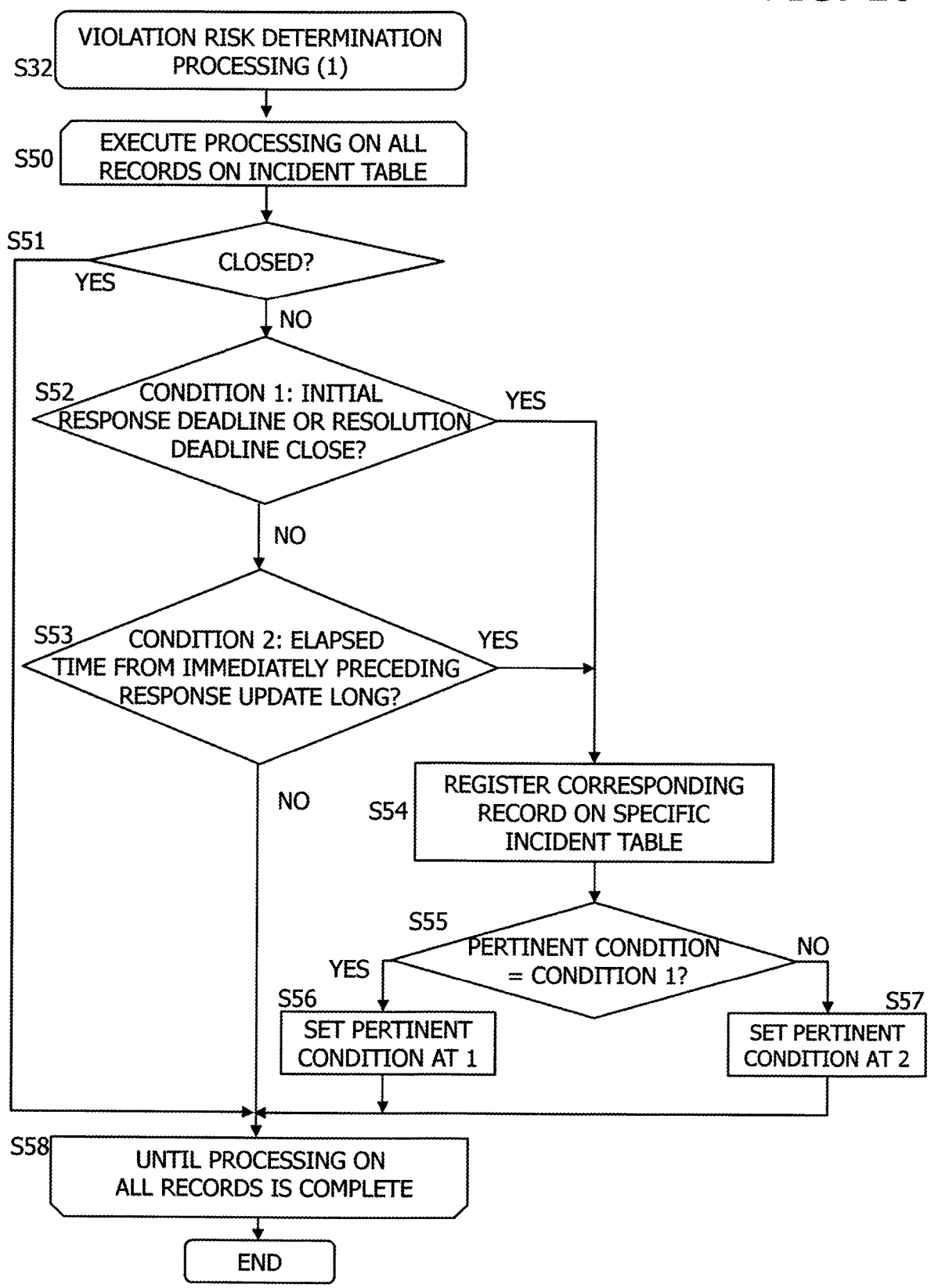
FIG. 10 is a flowchart illustrating the processing of the violation risk determination processing (1) S32.

FIG. 10 is a flowchart illustrating the processing of the violation risk determination processing (1) S32. The data update/visualization device 20 repeats the following processing on all of the incident data on the incident table (S50, S57). First, the data update/visualization device 20 determines whether or not the status of the incident data is "closed" (resolved) (S51). Closed (resolved) incident data do not have to be monitored, and therefore the following processing for determining whether or not a violation risk exists is implemented on incident data that are not closed.

Firstly, incident data that have a violation risk satisfy condition 1, which is that at the current time, the initial response deadline or the resolution deadline is close (S52). More specifically, an incident having the "documented" status, in relation to which the time remaining until the initial response deadline from the current time is less than a first reference value, and an incident having the "responding" status, in relation to which the time remaining to the resolution deadline from the current time is less than the first reference value, satisfy condition 1. The first reference value is set at twice the normal DB update interval, for example.

It is necessary to complete the initial response to an incident having the "documented" status by the initial response deadline, and when the time remaining until the initial response deadline from the current time is less than twice the normal DB update interval, this means that the initial response deadline is close and the risk of a KPI violation (a violation caused by the inability to execute the initial response by the initial response deadline) is high. Similarly, it is necessary to complete the resolution response to an incident having the "responding" status by the resolution deadline, and when the time remaining until the resolution deadline from the current time is less than twice the normal DB update interval, this means that the resolution deadline is close and the risk of a KPI violation (a violation caused by the inability to execute the resolution response by the resolution deadline) is high.

The reason for setting the first reference time at twice the normal DB update interval is that since an incident having a deadline that will arrive before an amount of time corresponding to twice the normal DB update interval has at least an amount of time corresponding to one normal DB update interval at the normal DB update interval until the deadline, therefore it is more likely to be possible to avoid a KPI violation. When the first reference value is set at an amount of time corresponding to one normal DB update interval, the deadline is already imminent at the point where a KPI violation risk is determined to exist, and it may therefore be impossible to avoid a KPI violation. For incidents needing a comparatively longer time to complete the response processing, the first reference value may be set at three times the normal DB update interval, or even longer. Furthermore, an optimum first reference value may be set in accordance with the type of the incident.

Secondly, incident data having a violation risk satisfy condition 2, which is that an elapsed time from the immediately preceding response update time to the current time equals or exceeds a second reference value (S53). More specifically, an incident having the "responding" status, in relation to which the elapsed time from the immediately preceding response update time to the current time equals or exceeds the second reference value, satisfies condition 2. The second reference value is set at twice the normal DB update interval, for example.

An incident having the "responding" status has at least undergone an initial response, but when a new response update is not performed (the response processing is not updated) for a long time following the immediately preceding response update time, including the initial response, this may mean that the incident administrator is busy responding to other incidents having a higher degree of priority, and that the incident has been left as it was. Hence, an incident that satisfies condition 2 does not have an immediate KPI violation risk, but since the incident has been forgotten, the risk of a KPI violation exists.

A specific incident that satisfies condition 1 is a specific incident having a high degree of priority. A specific incident that satisfies condition 2, meanwhile, is the specific incident having the next highest degree of priority.

In FIG. 10, the data update/visualization device registers incidents satisfying either of condition 1 and condition 2 in the specific incident table (S54). The pertinent condition of an incident satisfying condition 1 is set at "1", and the pertinent condition of an incident satisfying condition 2 is set at "2" (S55, S56, S57).

FIG. 16 is a view illustrating a specific example of the specific incident table 27. In the figure, four specific incidents are listed. Referring to FIG. 15, as regards the incident ID:001, among the incidents that are not closed, a long time has elapsed from the immediately preceding response update time (the update time) to the current time. Therefore, the incident ID:001 satisfies condition 2 and corresponds to a specific incident. Further, as regards the incident ID:004, sufficient time remains until the resolution deadline and the elapsed time from the immediately preceding response update time is short, and therefore the incident ID:004 does not satisfy condition 1 and condition 2. Hence, the incident ID:004 does not correspond to a specific incident.

As regards the incident ID:005, the status is "responding" and the resolution deadline is close. Therefore, the incident ID:005 satisfies condition 1 and corresponds to a specific incident. As regards the incident ID:006, the status is "documented" and the initial response deadline is less than the normal DB update interval away. Hence, the incident ID:006 already satisfied condition 1 at the time of the previous periodic collection (the normal processing), and therefore corresponds to a specific incident. Further, as regards the incident ID:007, the status is "documented" and the initial response deadline is less than twice the normal DB update interval away. Therefore, the incident ID:007 satisfies condition 1.

Accordingly, the incident IDs 001, 005, 006, and 007 are listed on the specific incident table in FIG. 16. The specific incident table 27 includes, in addition to the items on the incident table 26, a corresponding condition column, a remaining time T column, a no-update time $T^{Nu}$ column, a violation risk level column, and a specific DB update interval R column. These items will be described below.

FIG. 17 is a view depicting an example of a timetable of the specific incidents illustrated in FIG. 16. Only the specific incidents having the IDs 001, 005, 006, 007, among the seven incidents on the timetable of FIG. 15, are depicted.

Figure 11:
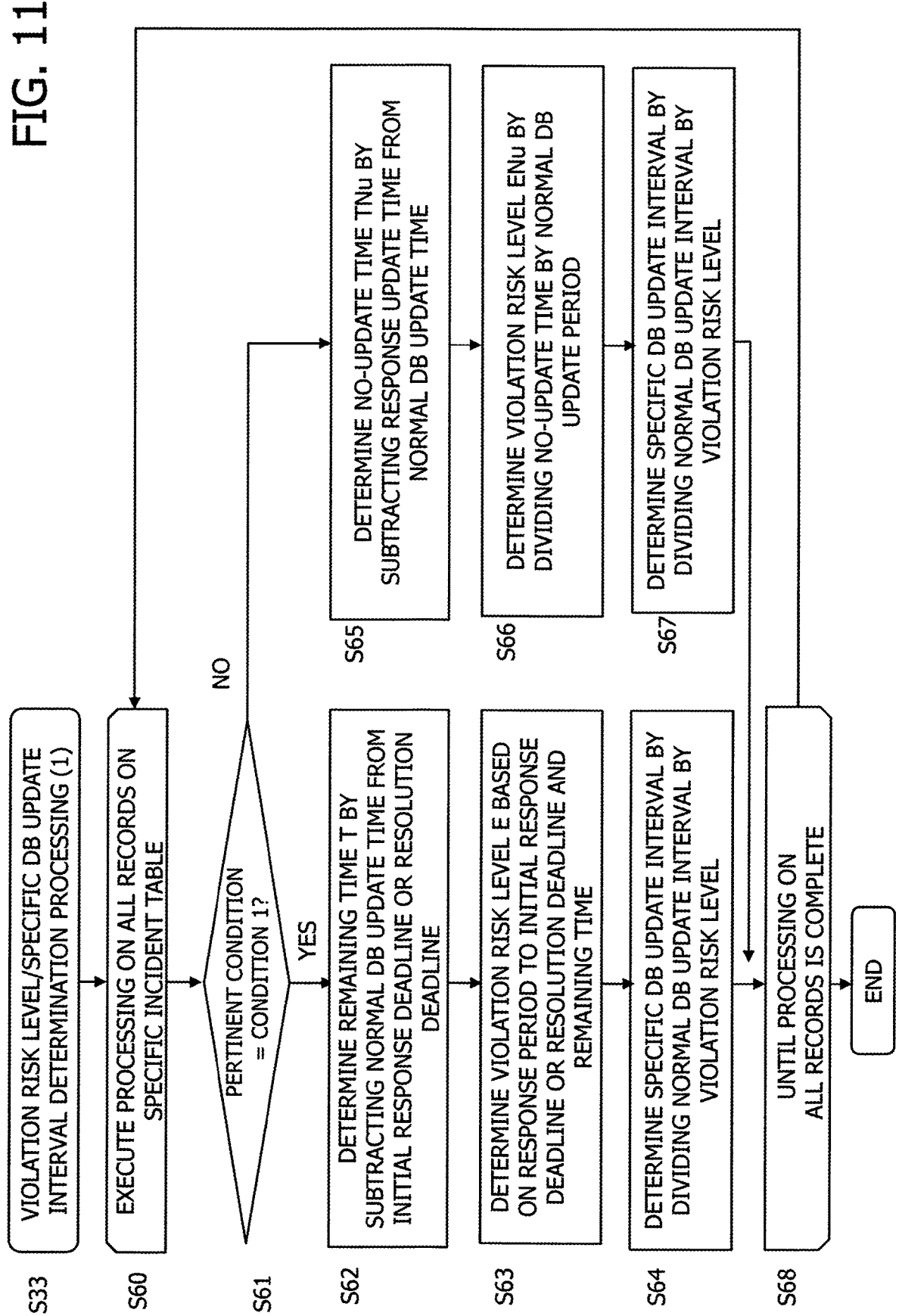
FIG. 11 is a flowchart illustrating processing executed during the violation risk level/specific DB update interval determination processing (1) S33.

FIG. 11 is a flowchart illustrating processing executed during the violation risk level/specific DB update interval determination processing (1) S33. This determination processing is executed on the specific incident data determined to have a violation risk in the violation risk determination processing S32, and includes respective determinations for determining the violation risk level of the specific incident data and a specific DB update interval corresponding to the violation risk level.

The data update/visualization device 20 executes the following processing on all of the incident data on the specific incident table (S60, S68). First, the data update/visualization device 20 determines whether or not the pertinent condition of the specific incident data is condition 1 (S61). When the pertinent condition is condition 1 (YES in S61), calculation processing (S62, S63, S64) is executed, and when the pertinent condition is condition 2 (NO in S61), calculation processing (S65, S66, S67) is executed.

When the pertinent condition is condition 1, the remaining time T is determined in accordance with Formula 1, illustrated below, by subtracting the current time (the normal DB update time, the periodic collection time) from the initial response deadline or the resolution deadline (S62).

$$T = date^{sol} - date^{pref} \quad \text{[Formula 1]}$$

T=the remaining time, $date^{sol}$=the initial response deadline or resolution deadline, $date^{pref}$=the periodic DB update time (the current time)

A violation risk level E is then determined in accordance with Formula 2, illustrated below, by subtracting the remaining time T from a response period $Time^{kpi}$ extending from documentation to the initial response deadline or a response period extending from the initial response to the resolution deadline, dividing the result by the response period $Time^{kpi}$, and then multiplying the result by 100 (S63).

$$E = Time^{kpi} - T/Time^{kpi} \times 100 \quad \text{[Formula 2]}$$

E=the violation risk level (%), $Time^{kpi}$=the response period, T=the remaining time The violation risk level increases steadily or gradually as the remaining time T decreases, and therefore, by subtracting the remaining time T from the response period, the violation risk level E increases steadily or gradually as the remaining time T decreases. Further, by subtracting the remaining time T from the response period $Time^{kpi}$ and dividing the result by the response period $Time^{kpi}$, normalization is achieved. By multiplying the divided value by 100, the violation risk level E is obtained as a percentage.

Finally, the specific DB update interval R is determined in accordance with Formula 3, illustrated below, by dividing the normal DB update interval by the violation risk level E. As a result, the specific DB update interval decreases steadily or gradually as the violation risk level E increases.

$$R = Time^{int}/E \quad \text{[Formula 3]}$$

R=the specific DB update interval, $Time_{int}$=the normal DB update interval

When the pertinent condition is condition 2, on the other hand, the no-update time is determined in accordance with Formula 4, illustrated below, by subtracting the immediately preceding response update time from the current time (S65).

$$T^{Nu} = date^{pref} - date^{upd} \quad \text{[Formula 4]}$$

$T^{Nu}$=the no-update time, $date^{upd}$=the response update time

A violation risk level $E^{Nu}$ for condition 2 is then determined in accordance with Formula 5, illustrated below, by dividing the no-update time by the normal DB update interval (S66).

$$E^{Nu} = T^{Nu}/Time^{int} \quad \text{[Formula 5]}$$

$E^{Nu}$=the violation risk level

In the case of a specific incident that satisfies condition 2, the violation risk level $E^{Nu}$ increases steadily or gradually as the no-update time $T^{Nu}$ lengthens, and therefore, by dividing the no-update time by the normal DB update interval, the violation risk level $E^{Nu}$ increases steadily or gradually as the no-update time lengthens.

Finally, the specific DB update interval R is determined in accordance with Formula 6, illustrated below, by dividing the normal DB update interval by the violation risk level $E^{Nu}$. As a result, the specific DB update interval decreases steadily or gradually as the violation risk level $E^{Nu}$ increases.

$$R = Time^{int}/E^{Nu} \quad \text{[Formula 6]}$$

R=the specific DB update interval

As described above, in relation to a specific incident that satisfies condition 1, any calculation by which the violation risk level increases steadily as the remaining time decreases may be implemented. Further, any calculation by which the specific DB update interval decreases as the violation risk level increases may be implemented. In relation to a specific incident that satisfies condition 2, meanwhile, any calculation by which the violation risk level increases as the no-update time lengthens may be implemented. Further, any calculation by which the specific DB update interval decreases as the violation risk level increases may be implemented.

On the specific incident table 27 of FIG. 16, the remaining time, the no-update time, the violation risk level, and the specific DB update interval calculated using the calculation formulae described above are indicated in relation to each of the four specific incidents.

Figure 12:
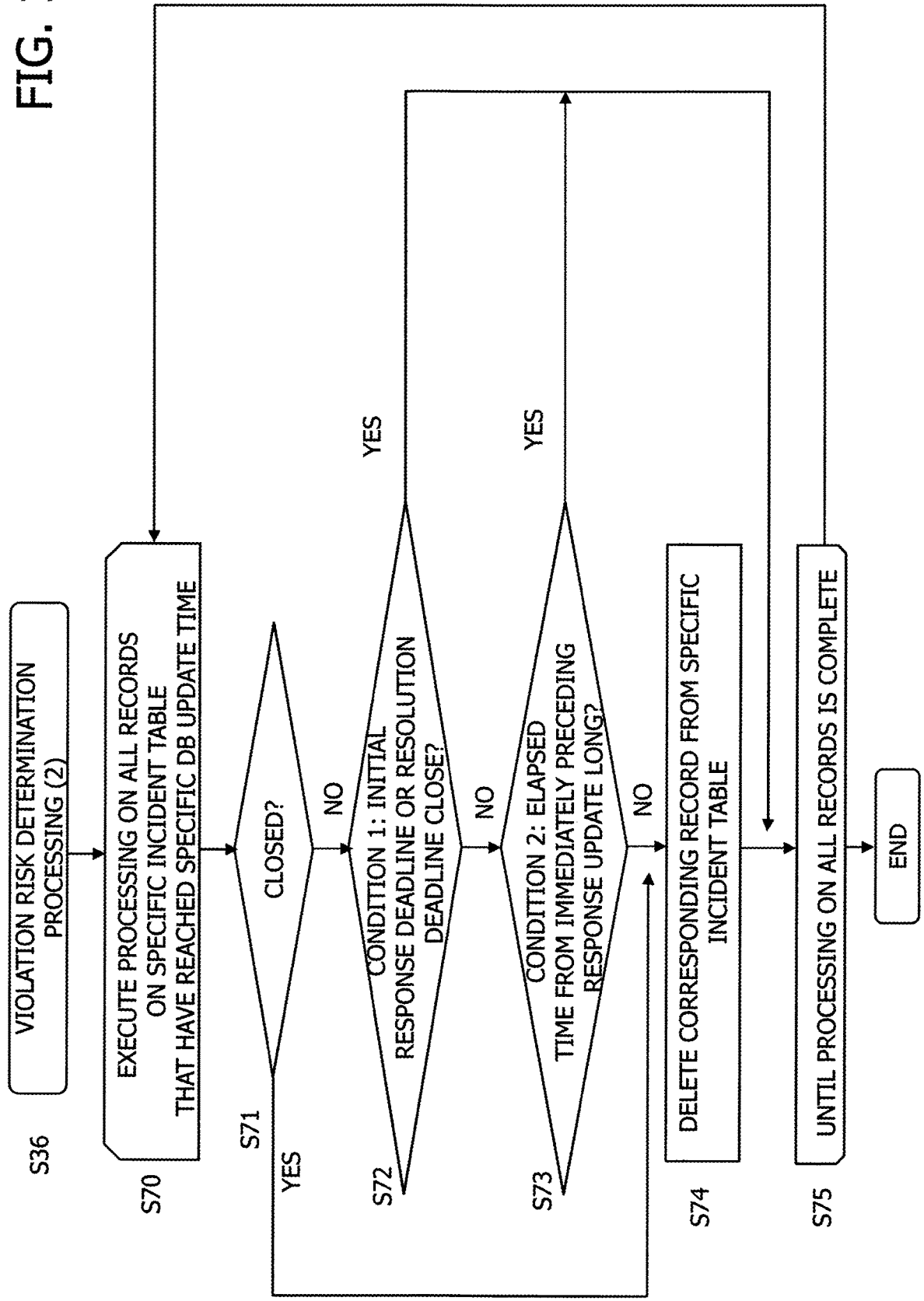
FIG. 12 is a flowchart illustrating processing executed during the violation risk determination processing (2) S36.

FIG. 12 is a flowchart illustrating processing executed during the violation risk determination processing (2) S36. This processing differs from the violation risk determination processing (1) S32 of FIG. 10 in that the processing is executed on all of the specific incident data on the specific incident table that have reached the specific DB update time (S70, S75). Further, when an incident is closed (YES in S71) or does not satisfy either condition 1 and condition 2 (NO in S72 and S73), the corresponding record is deleted from the specific incident table. Conditions 1 and 2 are identical to FIG. 10.

Hence, when the specific incident data on the specific incident table are collected from the incident management device and updated in the database DB at the specific DB update intervals set respectively in relation thereto, with the result that the updated specific incident data are resolved and closed and no longer satisfy condition 1 and condition 2, the data are deleted from the specific incident table.

Figure 13:
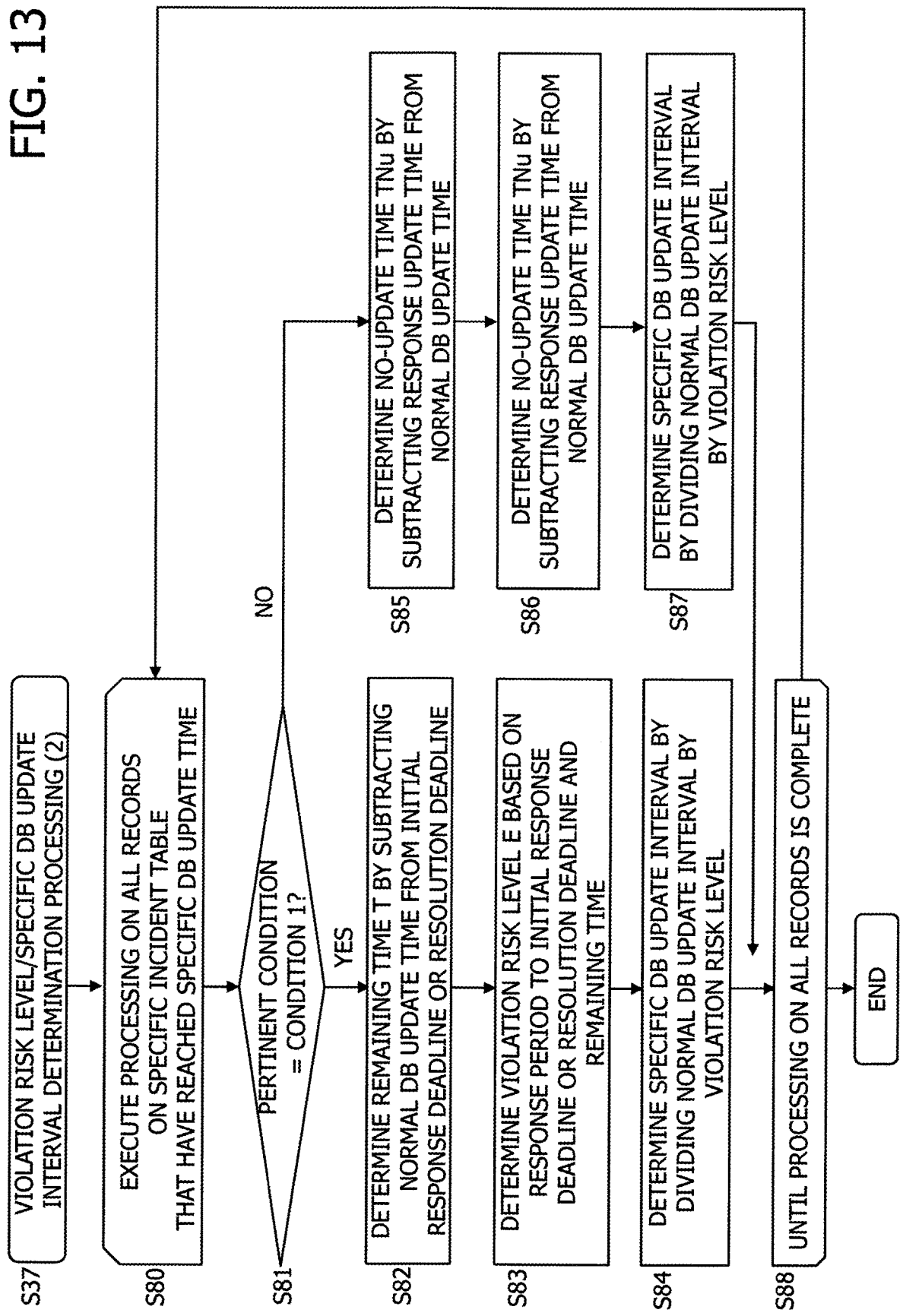
FIG. 13 is a flowchart illustrating processing executed during the violation risk level/specific DB update interval determination processing (2) S37.

FIG. 13 is a flowchart illustrating processing executed during the violation risk level/specific DB update interval determination processing (2) S37. This processing differs from the processing of FIG. 11 in that the processing is executed on all of the records on the specific incident table that have reached the specific DB update time (S80, S8). The method of calculating a new violation risk level and the method of calculating a new specific DB update interval are identical to FIG. 11.

Hence, when the specific incident data are collected and updated in the database at the specific DB update intervals set respectively in relation thereto, a new specific DB update interval is determined on the basis of the state of the data during the update. As a result, the specific incident data can be updated at a short specific DB update interval suitable for the current violation risk level thereof.

Third Embodiment

A third embodiment is an example of a data collection/visualization device that collects and updates progress data from a progress data management device of a graduation thesis management system.

Figure 18:
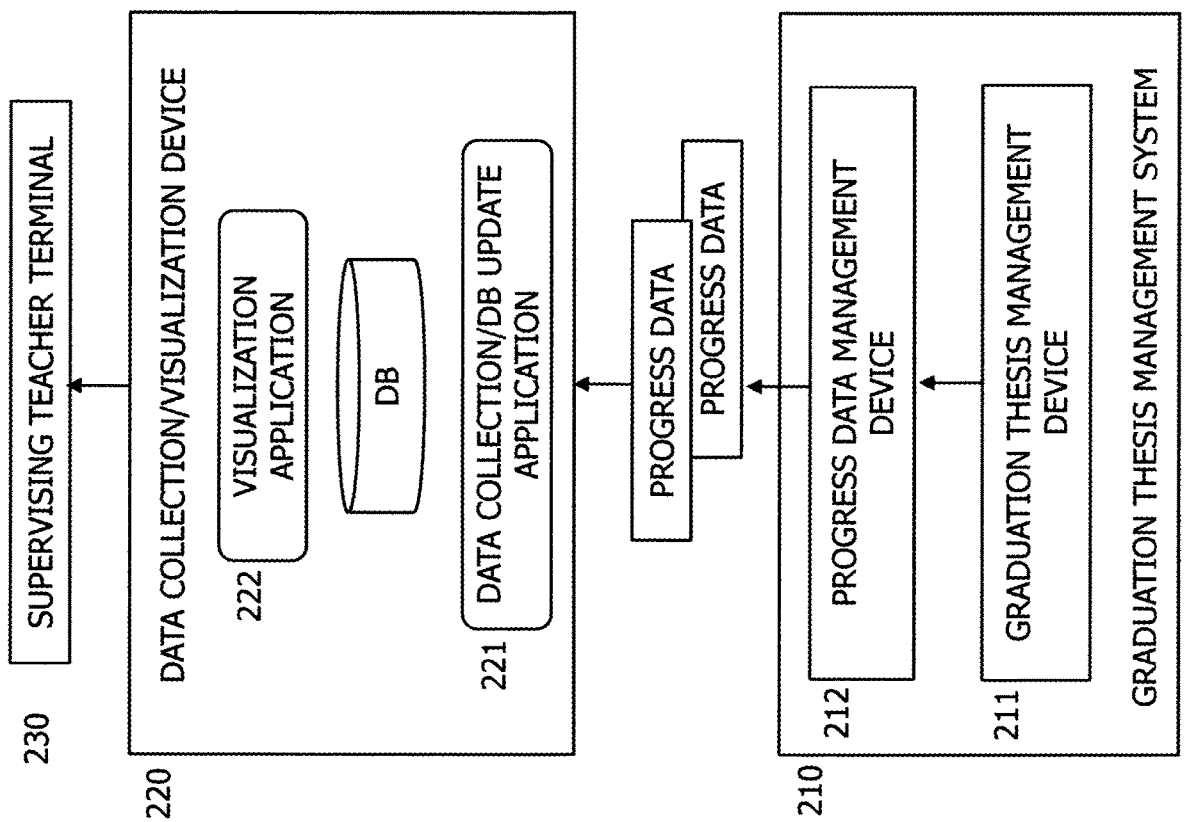
FIG. 18 is a view depicting respective configurations of the graduation thesis management system and the data collection/visualization device according to the third embodiment.

FIG. 18 is a view depicting respective configurations of the graduation thesis management system and the data collection/visualization device according to the third embodiment. A graduation thesis management system 210 includes a graduation thesis management device 211 for providing a graduation thesis management service to students, and a progress data management device 212 for managing progress data generated in relation to the graduation thesis of each student during provision of the graduation thesis management service.

For example, a basic configuration of graduation thesis management includes providing students with services such as providing a graduation thesis topic allocated to each student and related information needed to write the graduation thesis, providing e-learning including basic lectures on thesis writing methods, and providing management of history information generated as the graduation theses are written.

Meanwhile, the student, while writing the graduation thesis, provides progress data including drafts of the graduation thesis being written. For example, when the topic of the graduation thesis is confirmed, the student documents his/her graduation thesis by transmitting the topic of the graduation thesis to the progress data management device. During the process of writing the graduation thesis, an initial deadline for handing in a summary of the graduation thesis and a final deadline for handing in the final draft of the graduation thesis are determined. Further, the student transmits progress data to the progress data management device every time writing of the graduation thesis progresses.

A teacher supervising the students checks the states of progress of the graduation theses of a large number of students via a management screen on which the progress data, which are collected periodically by the data collection/visualization device 220 using a data collection/DB update application, are visualized by a visualization application 222.

In the example described above, similarly to the second embodiment, by executing the data collection/DB update application, a graduation thesis having a close initial deadline or final deadline is extracted as first specific graduation thesis data satisfying a first condition, and a graduation thesis that has not progressed for a long time following an immediately preceding progress data update is extracted as second specific graduation thesis data satisfying a second condition. A violation risk level is then calculated in relation to the progress data of the specific graduation thesis data, whereupon the specific DB update interval is determined to be steadily shorter as the violation risk level increases. The progress data are then collected at the specific DB update interval, whereby the supervising teacher can check the state of progress more closely to real time.

According to this embodiment, as described above, the data in the data management device can be collected and updated periodically, and in addition, specific data to be managed more closely can be collected and updated at the specific DB update interval. As a result, the data in the database can be monitored more closely to real time.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium storing therein a data update program for causing a computer to execute a process comprising:
   in response to receiving a plurality of data transmitted from a data management device at a first interval, executing a first update for updating data in a searchable database stored in a data storage with the received plurality of data;
   in response to detecting specific data satisfying a specific condition among the plurality of data in the database, the specific data having been updated in the first update, transmitting to the data management device a transmission request to transmit data identified by identification information of the specific data; and
   in response to receiving the data identified by the identification information of the specific data that is transmitted from the data management device in response to the transmission request, executing a second update for updating the specific data in the database with the received data, wherein
   the plurality of data are incident data including data relating to an incident occurring in a predetermined service device,
   the data management device manages the incident data,
   the specific condition is satisfied when a time remaining until a processing deadline of the incident is equal to or a shorter time than a reference time, and
   transmitting the transmission request includes transmitting the transmission request at a second interval that is a shorter time interval than the first interval.

2. A non-transitory computer-readable storage medium storing therein a data update program for causing a computer to execute a process comprising:
   in response to receiving a plurality of incident data transmitted from an incident management device at a predetermined interval, executing a first update for updating data in a searchable database with the received plurality of incident data;
   detecting, among the plurality of incident data in the database, the incident data being updated in the first update, first specific incident data in relation to which a first time remaining until a processing deadline is equal to or a shorter time than a first reference time, and second specific incident data in relation to which a second time that has elapsed since immediately preceding response processing is equal to or a longer time than a second reference time, and registering the first and second specific incident data in a specific database; and executing a specific update for collecting, from the incident management device, first data identified by identification information of the first specific incident data at a first specific update interval that is determined on the basis of shortness of the first time and second data identified by identification information of the second specific incident data at a second specific update interval that is determined on the basis of length of the second time, and for updating corresponding first and second specific incident data in the specific database with the collected first and second data.

3. The non-transitory computer-readable storage medium storing therein the update program according to claim 2, the process further comprising setting the first specific update interval to be a shorter time as the first time is shorter, and setting the second specific update interval to be a shorter time as the second time is a longer time.

4. The non-transitory computer-readable storage medium storing therein the data update program according to claim 2, the process further comprising:

generating a first violation risk level that is a higher risk level as the first time is a shorter time, and a second violation risk level that is a longer time as the second time is a shorter time, and setting the first specific update interval to be a shorter interval as the first violation risk level is a higher risk level, and setting the second specific update interval to be a shorter interval as the second violation risk level is a higher risk level.

5. The non-transitory computer-readable storage medium storing therein the data update program according to claim 3, the process further comprising:

determining, in relation to the updated first or second specific incident data, whether or not the first time is equal to or a shorter time than the first reference time or whether or not the second time equals or exceeds the first reference time, and when either one of the determinations is false, deleting the updated first or second specific incident data corresponding to the false determination from the specific database, wherein the first or second specific incident data deleted from the specific database are excluded from the specific update.

6. The non-transitory computer-readable storage medium storing therein the data update program according to claim 3, the process further comprising:

following the specific update, setting the first specific update interval or setting the second specific update interval in relation to the updated first specific incident data or second specific incident data.

7. A method of updating data comprising:

in response to receiving a plurality of data transmitted from a data management device at a first interval, executing a first update for updating data in a searchable database stored in a data storage with the received plurality of data;

in response to detecting specific data satisfying a specific condition among the plurality of data in the database, the specific data having been updated in the first update, transmitting to the data management device a transmission request to transmit data identified by identification information of the specific data; and in response to receiving the data identified by the identification information of the specific data that is transmitted from the data management device in response to the transmission request, executing a second update for updating the specific data in the database with the received data, wherein the plurality of data are incident data including data relating to an incident occurring in a predetermined service device, the data management device manages the incident data, the specific condition is satisfied when a time remaining until a processing deadline of the incident is equal to or a shorter time than a reference time, and transmitting the transmission request includes transmitting the transmission request at a second interval that is a shorter time interval than the first interval.

8. A data update device comprising:

a processor; and a memory to which the processor is able to access, wherein the processor executes a process including in response to receiving a plurality of data transmitted from a data management device at a first interval, executing a first update for updating data in a searchable database stored in a data storage with the received plurality of data;

in response to detecting specific data satisfying a specific condition among the plurality of data in the database, the specific data having been updated in the first update, transmitting to the data management device a transmission request to transmit data identified by identification information of the specific data; and in response to receiving the data identified by the identification information of the specific data that is transmitted from the data management device in response to the transmission request, executing a second update for updating the specific data in the database with the received data, wherein the plurality of data are incident data including data relating to an incident occurring in a predetermined service device, the data management device manages the incident data, the specific condition is satisfied when a time remaining until a processing deadline of the incident is equal to or a shorter time than a reference time, and transmitting the transmission request includes transmitting the transmission request at a second interval that is a shorter time interval than the first interval.

9. A method of updating data comprising:

in response to receiving a plurality of incident data transmitted from an incident management device at a predetermined interval, executing a first update for updating data in a searchable database with the received plurality of incident data;

detecting, among the plurality of incident data in the database, the incident data being updated in the first update, first specific incident data in relation to which a first time remaining until a processing deadline is equal to or a shorter time than a first reference time, and second specific incident data in relation to which a second time that has elapsed since immediately preceding response processing is equal to or a longer time than a second reference time, and registering the first and second specific incident data in a specific database; and executing a specific update for collecting, from the incident management device, first data identified by identification information of the first specific incident data at a first specific update interval that is determined on the basis of shortness of the first time and second data identified by identification information of the second specific incident data at a second specific update interval that is determined on the basis of length of the second time, and for updating corresponding first and second specific incident data in the specific database with the collected first and second data.

10. A data update device comprising:

a processor; and a memory to which the processor is able to access, wherein the processor executes a process including in response to receiving a plurality of incident data transmitted from an incident management device at a predetermined interval, executing a first update for updating data in a searchable database with the received plurality of incident data;

detecting, among the plurality of incident data in the database, the incident data being updated in the first update, first specific incident data in relation to which a first time remaining until a processing deadline is equal to or a shorter time than a first reference time, and second specific incident data in relation to which a second time that has elapsed since immediately preceding response processing is equal to or a longer time than a second reference time, and registering the first and second specific incident data in a specific database; and executing a specific update for collecting, from the incident management device, first data identified by identification information of the first specific incident data at a first specific update interval that is determined on the basis of shortness of the first time and second data identified by identification information of the second specific incident data at a second specific update interval that is determined on the basis of length of the second time, and for updating corresponding first and second specific incident data in the specific database with the collected first and second data.

* * * * *